(12) United States Patent  
Brantley et al.

(10) Patent No.: US 7,575,611 B2  
(45) Date of Patent: Aug. 18, 2009

(54) FUEL PROCESSOR FOR USE IN A FUEL CELL SYSTEM

(75) Inventors: Jennifer Brantley, Dublin, CA (US); Kenneth Newell, Livermore, CA (US); David Sopchak, Oakland, CA (US); Ian W. Kaye, Livermore, CA (US); Jesse Thompson, Brentwood, CA (US); Arpad Somogyvari, Livermore, CA (US)

(73) Assignee: UltraCell Corporation, Livermore, CA (US)

( * ) Notice: Subject to any disclaimer, the term of this patent is extended or adjusted under 35 U.S.C. 154(b) by 0 days.

(21) Appl. No.: 11/835,747

(22) Filed: Aug. 8, 2007

(65) Prior Publication Data

US 2008/0118796 A1 May 22, 2008

Related U.S. Application Data

(60) Provisional application No. 60/836,859, filed on Aug. 9, 2006.

(51) Int. Cl.
*B01J 7/00* (2006.01)

(52) U.S. Cl. .............................. 48/61; 48/119; 48/127.9; 48/128; 48/62 R; 48/89; 422/188; 422/189; 422/190; 422/191; 422/193; 422/198; 422/211; 422/222; 422/236

(58) Field of Classification Search ......... 422/187–191, 422/211, 222
See application file for complete search history.

(56) References Cited

U.S. PATENT DOCUMENTS

| | | | |
|---|---|---|---|
| 6,645,443 B1 * | 11/2003 | Vogel et al. | 422/200 |
| 2005/0008911 A1 | 1/2005 | Kaye | |
| 2005/0011125 A1 | 1/2005 | Kaye et al. | |
| 2006/0127719 A1 | 6/2006 | Brantley et al. | |
| 2006/0134470 A1 | 6/2006 | Kaye et al. | |

* cited by examiner

*Primary Examiner*—Alexa D. Neckel
*Assistant Examiner*—Kaity V. Handal
(74) *Attorney, Agent, or Firm*—Beyer Law Group LLP

(57) ABSTRACT

In one embodiment, a fuel processor for use in a fuel cell system, may have a bottom plate, having a regenerator having a first inlet to receive an air flow, a burner flow chamber within the regenerator, the burner flow chamber having a second inlet to receive the air flow from the regenerator, and a reformer flow chamber positioned between the regenerator and the burner flow chamber, the reformer flow chamber having a third inlet to receive the air flow from the burner chamber, wherein the burner flow chamber and the reformer flow chamber is formed of a monolithic structure having an elongated, rounded baffle in the center of the monolithic structure. The fuel processor may also have a top plate coupled to the bottom plate to enclose the fuel processor, the top plate having a top surface and a bottom surface.

16 Claims, 20 Drawing Sheets

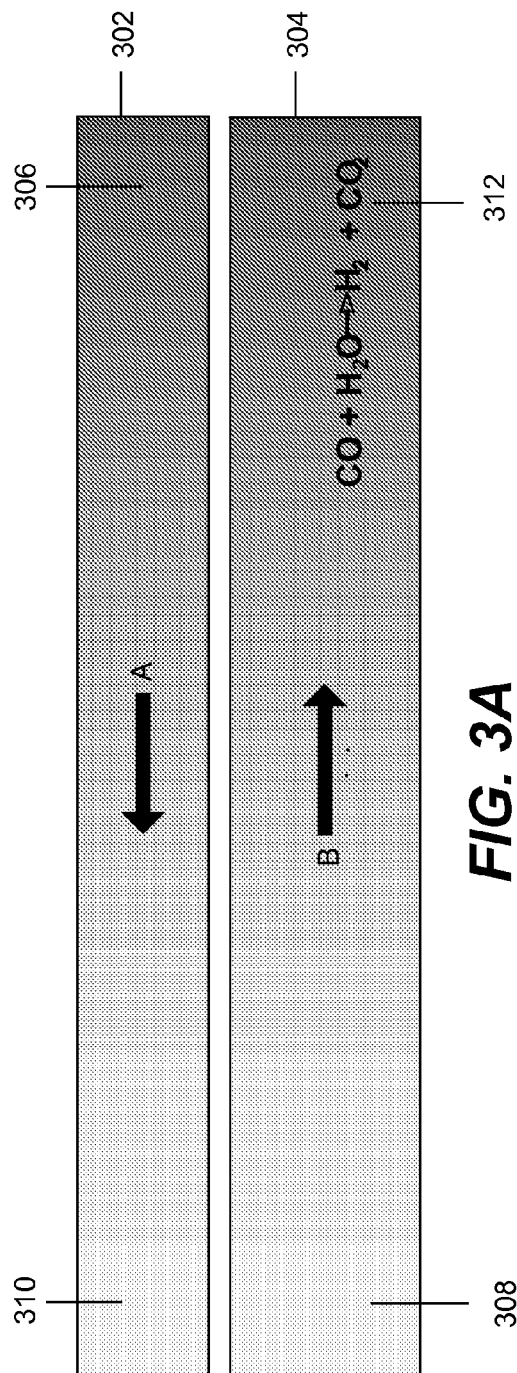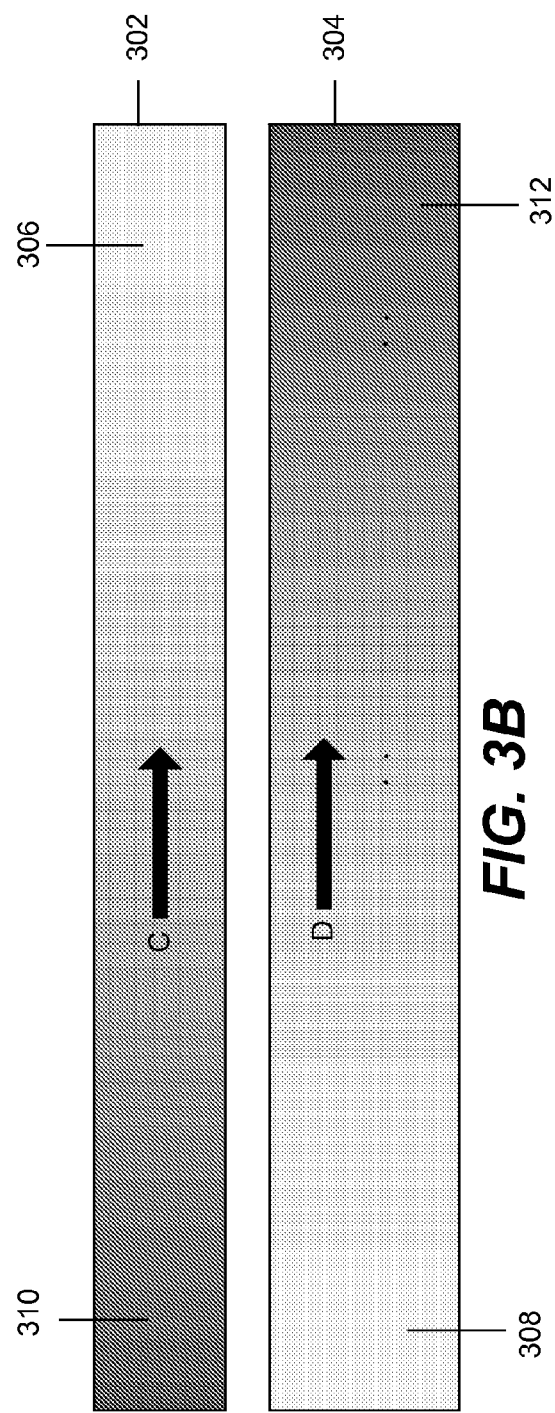
FIG. 3A
FIG. 3B

FUEL PROCESSOR FOR USE IN A FUEL CELL SYSTEM

CROSS REFERENCE TO RELATED APPLICATIONS

This application claims priority under 35 U.S.C. §119(e) to U.S. Provisional Patent Application No. 60/836,859 filed on Aug. 9, 2006 entitled "Fuel Processor For Use In A Fuel Cell System", which is incorporated by reference herein for all purposes.

FIELD OF THE INVENTION

The present disclosure relates generally to fuel cell technology. In particular, the invention relates to a fuel processor, used in a fuel cell system, to convert a fuel source to hydrogen.

BACKGROUND OF THE INVENTION

Commonly, a fuel processor is often designed specifically for a given fuel cell stack based on the fuel cell's power performance, size and hydrogen fuel consumption requirements. As such, it can only be integrated with a given cell stack. The fuel processor is also a separate device, thermally and fluidically, and requires substantial fluidic and gaseous manifolding and thermal insulation, which adds to the fuel cell system volume and mass. In addition, some fuel cell stack designs rely on a separate device (such as a stack burner) to assist the stack in achieving operation temperatures.

A fuel cell system electrochemically combines hydrogen and oxygen to produce electrical energy. A reformed hydrogen supply processes a fuel source to produce hydrogen. The fuel source acts as a hydrogen carrier. Currently available hydrocarbon fuel sources include methanol, ethanol, gasoline, propane and natural gas. The reaction in the fuel processor should be carried out under controlled temperatures to improve the performance of the processor by preventing hot and cold spots, efficiently convert the hydrocarbon fuel source to hydrogen, and preserve the integrity of the catalyst in the catalytic chamber. Thermal inefficiencies in a fuel cell system wastes energy and undesirably requires more fuel to be consumed and carried.

OVERVIEW

A fuel processor for use in a fuel cell system, may be formed from a monolith structure wherein the fluid flow directions in the burner flow chamber and the reformer flow chamber are directed in the same direction. This allows the fuel processor to be run under controlled temperatures to improve the performance of the processor by preventing hot and cold spots, efficiently convert the hydrocarbon fuel source to hydrogen, and preserve the integrity of the catalyst in the catalytic chamber.

In one embodiment, a fuel processor for use in a fuel cell system, may have a bottom plate, having a regenerator having a first inlet to receive an air flow, a burner flow chamber within the regenerator, the burner flow chamber having a second inlet to receive the air flow from the regenerator, and a reformer flow chamber positioned between the regenerator and the burner flow chamber, the reformer flow chamber having a third inlet to receive the air flow from the burner chamber, wherein the burner flow chamber and the reformer flow chamber is formed of a monolithic structure having an elongated, rounded baffle in the center of the monolithic structure. The fuel processor may also have a top plate coupled to the bottom plate to enclose the fuel processor, the top plate having a top surface and a bottom surface.

In another embodiment, a fuel processor for use in a fuel cell system may have a plurality of micro-tubes coupled to each other in parallel to form a flow field tube array, each of the plurality of micro-tubes designed to receive a fluid flow, a catalyst layer deposited inside each of the plurality of micro-tubes, and at least one burner coupled to a first end of the flow field tube array.

In yet another embodiment, a method for manufacturing a fuel processor, may comprise coupling a plurality of micro-tubes in parallel to form a flow field tube array, each of the plurality of micro-tubes designed to receive a fluid flow, depositing a catalyst layer inside each of the plurality of micro-tubes, and attaching at least one burner to a first end of the flow field tube array.

These and other features will be presented in more detail in the following detailed description of the invention and the associated figures.

BRIEF DESCRIPTION OF THE DRAWINGS

The accompanying drawings, which are incorporated into and constitute a part of this specification, illustrate one or more example embodiments and, together with the description of example embodiments, serve to explain the principles and implementations.

In the drawings:

FIGS. 3A-3D illustrate an example flow path for a fuel in a fuel processor.

DESCRIPTION OF EXAMPLE EMBODIMENTS

Embodiments are described herein in the context of a fuel processor for use in a fuel cell system. The following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Exemplary Fuel Processor

Figure 1A:
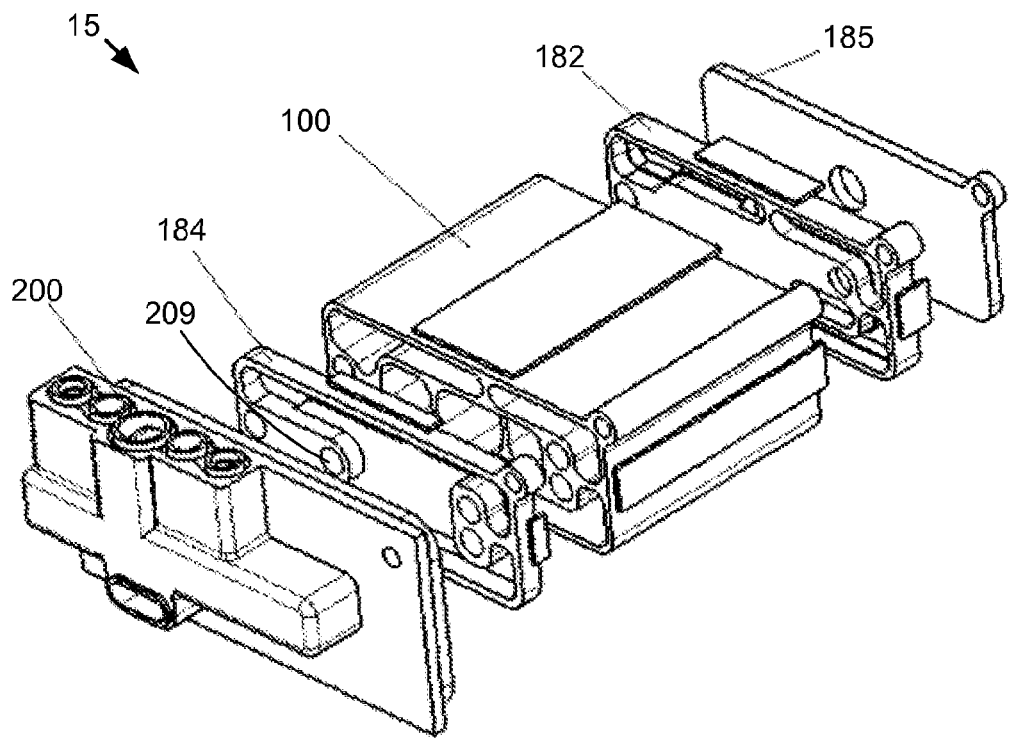
FIGS. 1A and 1B illustrate an example fuel processor.
Figure 1B:
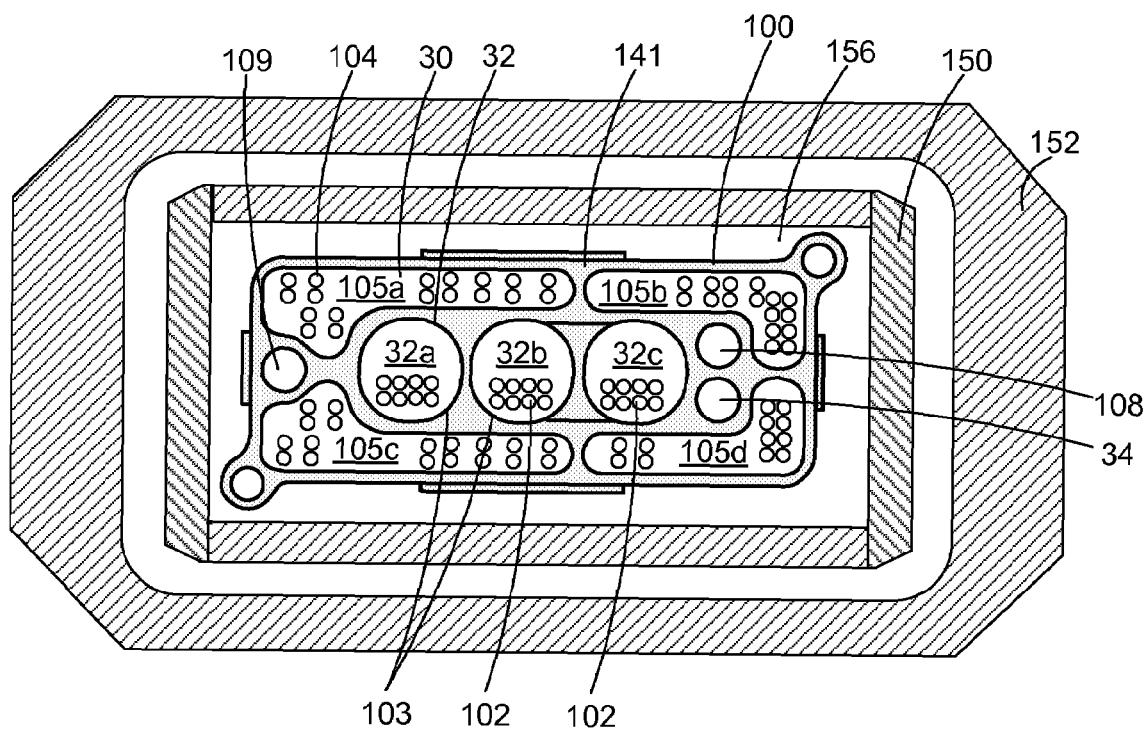

FIGS. 1A and 1B illustrate an example fuel processor. FIG. 1A illustrates a top perspective view of the fuel processor used in a fuel cell system. Fuel processor 15 may reform methanol to produce hydrogen. Fuel processor 15 comprises monolithic structure 100, end plates 182 and 184, end plate 185, reformer 32, heater 30, boiler 34, boiler 108, recuperator 150 and housing 152 (FIG. 1B). Although described with respect to methanol consumption for hydrogen production, it is understood that fuel processors may consume another fuel source, such as ethanol, gasoline, propane, and other fuel sources.

As the term is used herein, 'monolithic' refers to a single and integrated structure that includes at least portions of multiple components used in fuel processor 15. As shown in FIG. 1B, a cross-sectional front view of monolithic structure 100 taken through a mid-plane of fuel processor 15, monolithic structure 100 includes reformer 32, burner 30, boiler 34 and boiler 108. Monolithic structure 100 also includes associated plumbing inlets and outlets for reformer 32, burner 30 and boiler 34 disposed on end plates 182 and 184 and interconnect 200. Monolithic structure 100 comprises a common material 141 that constitutes the structure. The monolithic structure 100 and common material 141 simplify manufacture of fuel processor 15. For example, using a metal for common material 141 allows monolithic structure 100 to be formed by extrusion. In a specific embodiment, monolithic structure 100 is consistent in cross sectional dimensions between end plates 182 and 184 and solely comprises copper formed in a single extrusion.

An interconnect 200 may be disposed at least partially between the fuel cell and the fuel processor to form a structural and plumbing intermediary between the two. Interconnect is described in commonly owned co-pending patent application Ser. No. 11/120,643, entitled "Compact Fuel Cell Package", filed May 2, 2005 which is incorporated by reference for all purposes, and will not be discussed herein for brevity.

Housing 152 provides mechanical protection for internal components of fuel processor 15 such as burner 30 and reformer 32. Housing 152 also provides separation from the environment external to processor 15 and includes inlet and outlet ports for gaseous and liquid communication in and out of fuel processor 15. Housing 152 includes a set of housing walls that at least partially contain a recuperator 150 and provides external mechanical protection for components in fuel processor 15. The walls may comprise a suitably stiff material such as a metal or a rigid polymer, for example. Recuperator 150 improves thermal heat management for fuel processor 15 by a) allowing incoming air to be pre-heated before entering burner 30, b) dissipating heat generated by burner 32 into the incoming air before the heat reaches the outside of housing 152.

Figure 11A:
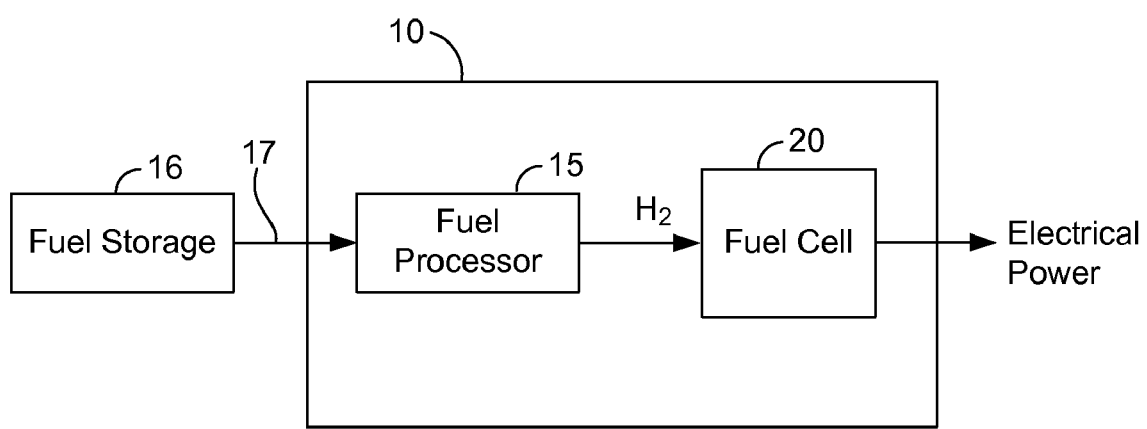
FIGS. 11A and 11B illustrate an example fuel cell package and a schematic operation of the fuel cell package.
Figure 11B:
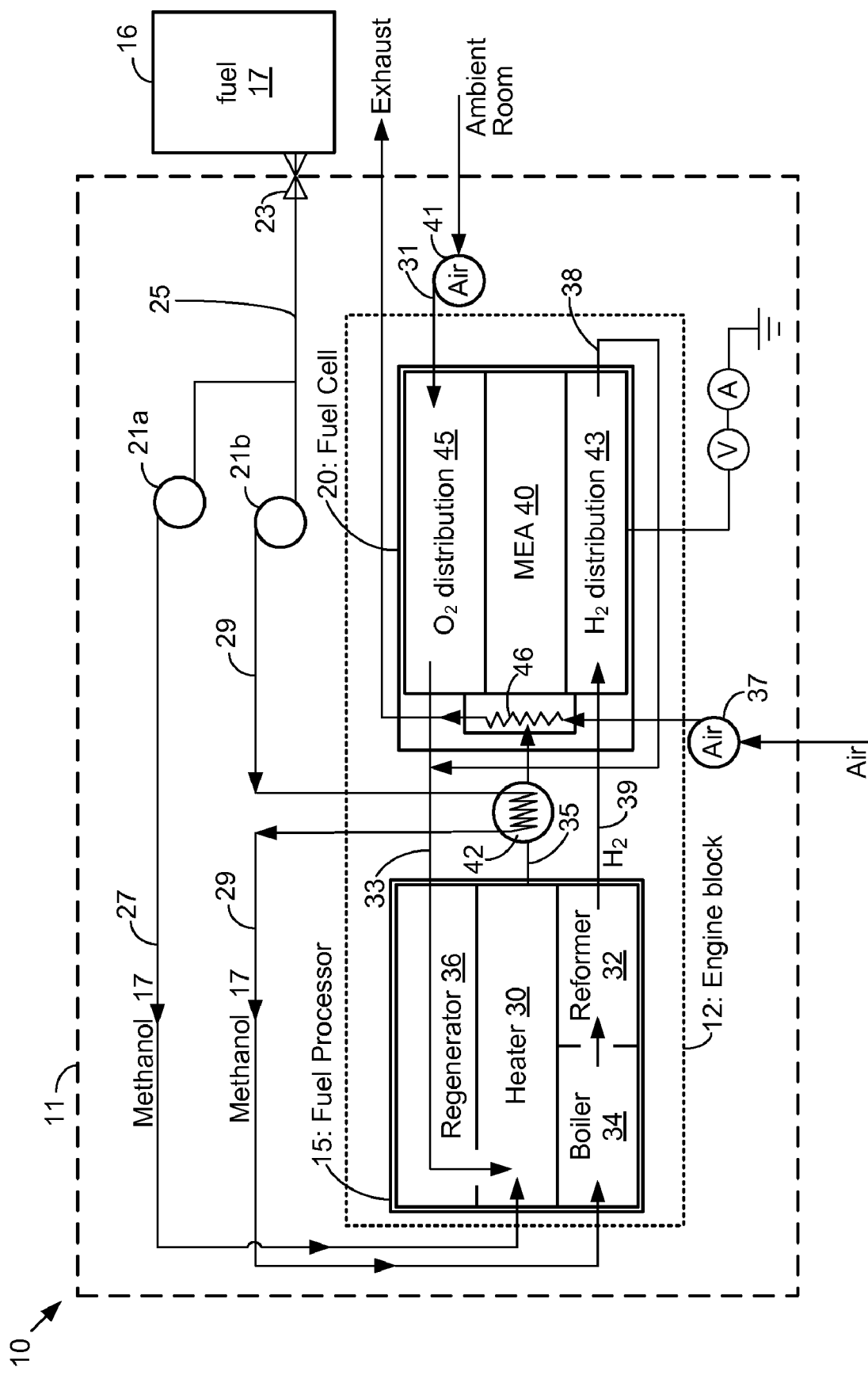

Boiler 34 heats methanol before reformer 32 receives the methanol. Boiler 34 receives methanol via a fuel source inlet 81 on interconnect 200, which couples to a methanol supply line 27 (FIG. 11B). Since methanol reforming and hydrogen production via a catalyst 102 in reformer 32 often requires elevated methanol temperatures, fuel processor 15 pre-heats the methanol before receipt by reformer 32 via boiler 34. Boiler 34 is disposed in proximity to burner 30 to receive heat generated in burner 30. The heat transfers via conduction through monolithic structure from burner 30 to boiler 34 and via convection from boiler 34 walls to the methanol passing therethrough. In one embodiment, boiler 34 is configured to vaporize liquid methanol. Boiler 34 then passes the gaseous methanol to reformer 32 for gaseous interaction with catalyst 102.

Reformer 32 is configured to receive methanol from boiler 34. Walls 111 in monolithic structure 100 and end walls 113 on end plates 182 and 184 define dimensions for a reformer chamber 103. In one embodiment, end plate 182 and/or end plate 184 includes a channel that routes heated methanol exhausted from boiler 34 into reformer 32.

In one embodiment, a reformer includes a multi-pass arrangement. Reformer 32 includes three multi-pass portions that process methanol in series: chamber section 32a, chamber section 32b, and chamber section 32c. A reformer chamber 103 then includes the volume of all three sections 32a-c. Each section traverses the length of monolithic structure 100 and opens to each other in series such that sections 32a-c form one continuous path for gaseous flow. More specifically, heated and gaseous methanol from boiler 34 a) enters reformer chamber section 32a at an inlet end of monolithic structure 100 and flows to the other end over catalyst 102 in section 32a, b) then flows into chamber section 32b at the second end of monolithic structure 100 and flows to the inlet end over catalyst 102 in section 32b, and c) flows into chamber section 32c at one end of monolithic structure 100 and flows to the other end over catalyst 102 in the chamber section 32c.

Reformer 32 includes a catalyst 102 that facilitates the production of hydrogen. Catalytic combustion provides heat for the reforming process and lessens emissions. Better heat and mass transfer improves performance of the reforming process, both with regard to combustion and steam reforming. Catalyst 102 reacts with methanol and produces hydrogen gas and carbon dioxide. In one embodiment, catalyst 102 comprises pellets packed to form a porous catalyst bed or otherwise suitably filled into the volume of reformer chamber 103. Pellet diameters ranging from about 50 microns to about 1.5 millimeters are suitable for many applications. Pellet diameters ranging from about 500 microns to about 1 millimeter are suitable for use with reformer 32. Pellet sizes may be varied relative to the cross sectional size of reformer sections 32a-c, e.g., as the reformer sections increase in size so does catalyst 102 pellet diameters.

Pellet sizes and packing may also be varied to control the pressure drop that occurs through reformer chamber 103. In one embodiment, pressure drops from about 0.2 to about 2 psi gauge are suitable between the inlet and outlet of reformer chamber 103. However, the mass of gaseous material flowing through the reactor may affect heat transfer. For example, the pressure drop across a packed catalyst bed may be relatively high and the fans, blowers or compressors used in the process may limit mass flow through the catalyst bed. The combustion process may further be limited by the use of oxygen depleted "air" and require high volumetric flows through the catalyst bed to provide sufficient oxygen for complete combustion. The cooling effect of these high flows may be substantial as the heating and cooling of large volumes of inert gases may decrease the efficiency of the fuel cell system 10.

One suitable catalyst 102 may include copper-zinc alloy (CuZn) coated onto alumina pellets when methanol is used as a hydrocarbon fuel source 17. Other materials suitable for catalyst 102 include platinum (Pt), palladium (Pd), a platinum/palladium mix, nickel, and other precious metal catalysts for example. In another embodiment, catalyst 102 may also comprise catalyst materials listed herein coated onto a metal sponge or metal foam. However, some catalysts used for combustion may include a shell of active material, such Pt or Pd, on an alumina core. The bulk of the catalyst may consist of the alumina, which may be a relatively poor thermal conductor. Thus, much of the initial energy produced during startup of a reformer may be used to heat the alumina and heat transfer to the alumina limits rapid thermal response of the fuel cell system 10. Furthermore, some steam reforming catalysts may also have relatively low thermal conductivity, which further complicates heat transfer from the catalytic heater. Thus, in another embodiment, a thermally conductive substrate such as aluminum in the form of a porous metal or metallic sponge may be used as the catalyst. The porosity of the metal or sponge, and consequently the pressure drop, may be controlled to meet fuel processor and fuel cell system requirements.

Figure 2:
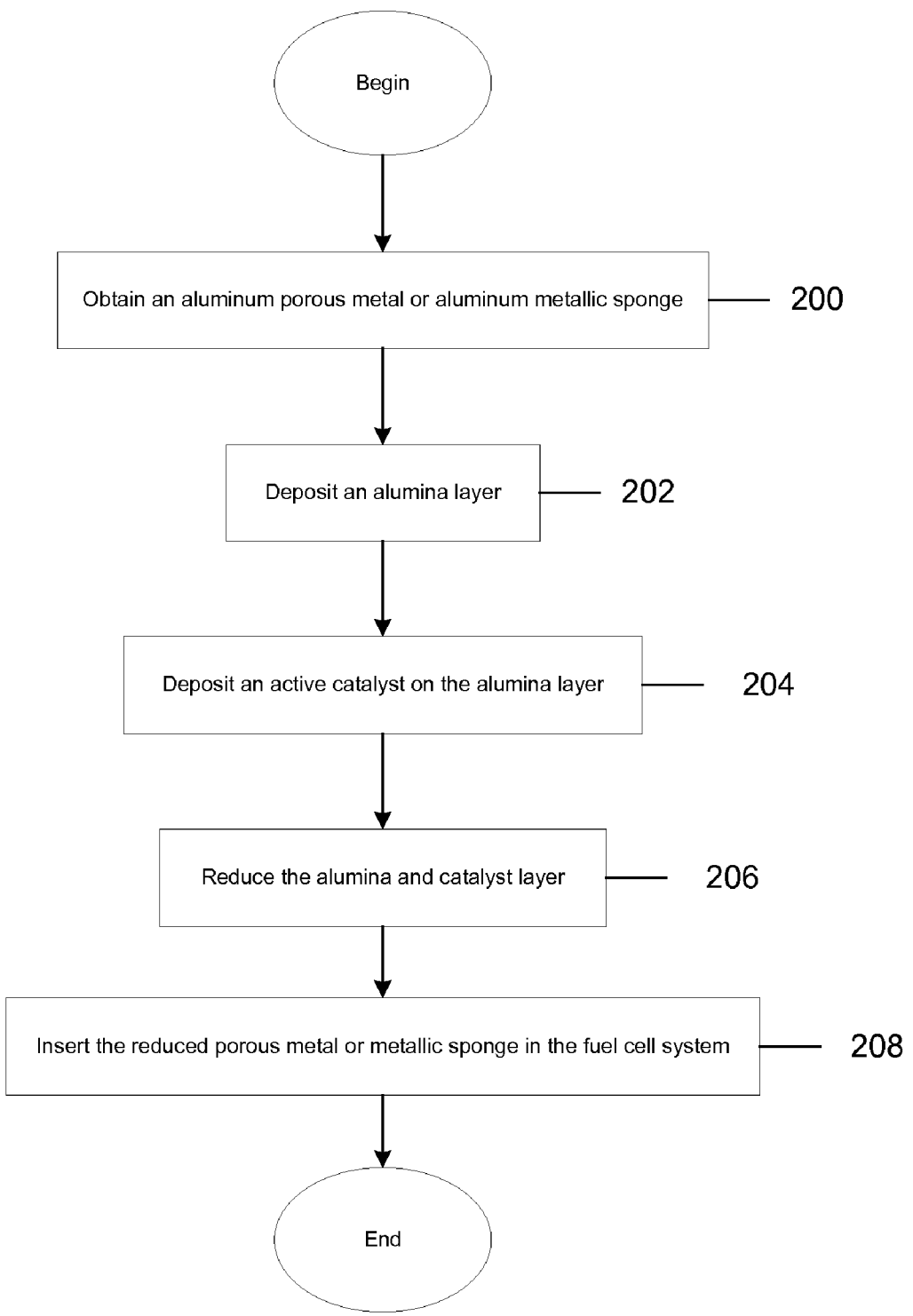
FIG. 2 is a flow diagram illustrating an example method for forming a catalyst for use in a fuel cell system.

FIG. 2 is a flow diagram illustrating a example method for forming a catalyst for use in a fuel cell system. The catalyst may be used in the reformer or burner. A thermally conductive aluminum porous metal or aluminum metallic sponge substrate may be obtained at 200. An alumina layer may be deposited on the thermally conductive substrate at 202. The substrate may be anodized to deposit the alumina layer. Other methods may also be used, such as chemical and electrochemical etching.

An active catalyst may be deposited onto the alumina layer at 204. The catalyst deposited may be specific for an intended purpose. For example, chloroplatinic acid may be deposited onto the alumina layer for use in the burner. The depth of the alumina layer may be controlled to optimize both adhesion of an active catalyst and heat transfer to the aluminum. An outer surface of the aluminum may also be constructed to optimize heat transfer between it and a reactor wall. Consequently, a large portion of the heat transfer proceeds via conduction through the substrate.

The catalyst layer may then be reduced at 206 to remove the hydrogen or acid before being inserted into the fuel cell system at 208. As stated above, the catalyst may be inserted into the reformer and/or burner. The substrate may be reduced by any known method, such as by the introduction of hydrogen gas into the catalyst layer.

In another embodiment, a fuel processor may include a microlith reactor, where the porosity, and consequently the pressure drop, can be controlled in a manufacturing process. An example of a microlith reactor may be those made by Precision Combustion, Inc. of North Haven, Conn. For example, heat transfer in the reformer may be improved by use of a Raney Copper-Zinc catalyst. The starting material, a copper-zinc-aluminum (Cu—Zn—Al) alloy, may be prepared to optimize the Cu:Zn ratio. The fully extracted catalyst may include a metallic powder while a partially extracted catalyst may be shaped to maximize contact with the catalytic burner.

Use of the porous metal or metallic sponge may improve heat transfer within the catalyst bed and from the combustion chamber to the reforming chamber. This promotes a more even temperature distribution throughout the reactors and allow for more energy efficient operation. Additionally, a wash coat of the desired metal catalyst material may be placed onto the walls of the reformer chamber or the burner chamber to improve heat transfer.

Referring back to FIGS. 1A and 1B, reformer 32 is configured to output hydrogen and includes an outlet port 209 that communicates hydrogen formed in reformer 32 outside of fuel processor 15. Port 209 is disposed on a wall of end plate 184 and includes a hole that passes through the wall. Port 209 opens to hydrogen conduit 204a in interconnect 200, which then forms part of a hydrogen provision line 39 (FIG. 11B). Line 39 communicates the hydrogen to the anode of fuel cell 20 for electrical energy generation.

Hydrogen production in reformer 32 is slightly endothermic and draws heat from burner 30. Burner 30 generates heat and is configured to provide heat to reformer 32. As shown in FIG. 1B, burner 30 may comprise four burner chambers 105a-d that surround reformer 32. In one embodiment, burner 30 uses electrical resistance and electrical energy to produce heat.

In the embodiment shown, burner 30 employs catalytic combustion to produce heat. As the term is used herein, a burner refers to a heater that uses a catalytic heating process to generate heat. A heater in a fuel processor may alternatively employ electrical heating, for example. A catalyst 104 disposed in each burner chamber 105 helps a burner fuel passed through the chamber generate heat. Burner 30 includes an inlet that receives methanol 17 from boiler 108 via a channel in one of end plates 182 or 184. In one embodiment, methanol produces heat in burner 30 and catalyst 104 facilitates the methanol production of heat. In another embodiment, waste hydrogen from fuel cell 20 produces heat in the presence of catalyst 104. Suitable burner catalysts 104 may include platinum or palladium coated onto alumina pellets for example. Other materials suitable for catalyst 104 include iron, tin oxide, other noble-metal catalysts, reducible oxides, and mixtures thereof.

The pellets that may be packed into burner chamber 105 to form a porous bed or otherwise suitably filled into the burner chamber volume. Catalyst 104 pellet sizes may be varied relative to the cross sectional size of burner chamber 105. Catalyst 104 may also comprise catalyst materials listed above coated onto a metal sponge or metal foam as discussed with reference to FIG. 2. Moreover, catalyst 104 may be wash coated onto the walls of burner chamber 105.

Some fuel sources generate additional heat in burner 30, or generate heat more efficiently, with elevated temperatures. Fuel processor 15 includes a boiler 108 that heats methanol before burner 30 receives the fuel source. In this case, boiler 108 receives the methanol via fuel source inlet 85. Boiler 108 is disposed in proximity to burner 30 to receive heat generated in burner 30. The heat transfers via conduction through monolithic structure from burner 30 to boiler 108 and via convection from boiler 108 walls to the methanol passing therethrough.

Air including oxygen enters fuel processor 15 via air inlet port 91. Burner 30 uses the oxygen for catalytic combustion of methanol. A burner 30 in fuel processor 15 generates heat and typically operates at an elevated temperature. In one embodiment, fuel processor 15 comprises a recuperator 150 to improve thermal management for fuel processor 15. Recuperator 150 at least partially thermally isolates components internal to housing 152—such as burner 30—and contains heat within fuel processor 15. Recuperator 150 is configured such that air passing through recuperator chamber 156 receives heat generated in burner 30. Recuperator 150 offers thus two functions for fuel processor 15: a) it permits active cooling of components within fuel processor 15 before the heat reaches an outer portion of the fuel processor, and b) it pre-heats the air going to burner 30. Air first passes along the outside of recuperator 150 before passing through apertures in the recuperator and along the inside of recuperator 150. This heats the air before receipt by air inlet port 93 of burner 30.

In one embodiment, as illustrated in FIG. 11B, fuel cell system or package 10 runs anode exhaust from the fuel cell 20 back to fuel processor. Line 38 routes unused hydrogen from fuel cell 20 burner inlet 109, which provides the anode exhaust to burner 30 (or to the regenerator 36 and then to burner inlet 109 and into burner 30). Burner 30 includes a thermal catalyst that reacts with the unused hydrogen to produce heat. Since hydrogen consumption within fuel cell 20 is often incomplete and the anode exhaust often includes unused hydrogen, re-routing the anode exhaust to burner 30 allows fuel cell system 10 to capitalize on unused hydrogen in fuel cell 20 and increase hydrogen usage and efficiency. Package 10 thus provides flexibility to use different fuels in a catalytic burner 30. For example, if fuel cell 20 can reliably and efficiently consume over 90% of the hydrogen in the anode stream, then there may not be sufficient hydrogen to maintain reformer and boiler operating temperatures in fuel processor 15. Under this circumstance, methanol supply is increased to produce additional heat to maintain the reformer and boiler temperatures.

Referring now to FIG. 1B, burner inlet 109 traverses monolithic structure 100 and carries anode exhaust from fuel cell 20 before provision into burner 30. Disposing burner inlet 109 adjacent to a burner chamber 105 also heats the incoming anode exhaust, which reduces heat transferred to the anode exhaust in the burner chamber 105.

Referring back to FIG. 11B, in another embodiment, package 10 runs a heating medium from fuel processor 15 to fuel cell 20 to provide heat to fuel cell 20. In this case, package 10 includes plumbing configured to transport the heating medium from fuel processor 15 to fuel cell 20. As the term is used herein, plumbing may comprise any tubing, piping and/or channeling that communicates a gas or liquid from one location to a second location. The plumbing may also comprise one or more valves, gates or other devices to facilitate and control flow. Plumbing between burner 30 and fuel cell 20 occurs via interconnect 200.

In a specific embodiment, line 35 transports heated gases to fan 37, which moves the heated gases within fuel cell 20 and across the fuel cell stack and heat transfer appendages. Alternatively, the plumbing may be configured to transport the heating medium from burner 30 to one or more heat transfer appendages. In this case, line 35 may continue through the fuel cell housing and open in the proximity of one or more heat transfer appendages. A hole in the fuel cell housing then allows line 35 to pass therethrough or connect to a port that communicates the gases to plumbing inside the fuel cell for delivery to the fuel cell stack and heat transfer appendage. For catalytic heat generation in fuel cell 20, the plumbing may also transport the heating medium to facilitate gaseous interaction with the catalyst, such as plumbing delivery to one or more bulkheads.

In one embodiment, the heating medium comprises heated gases exhausted from burner 30. A catalytic burner or electrical resistance burner operates at elevated temperatures. Cooling air exhausted from an electric burner or product gases exhausted from a catalytic burner are often greater than about 100 degrees Celsius when the gases leaves the fuel processor. For many catalytic burners, depending on the fuel source employed, the heating medium is commonly greater than about 200 degrees Celsius when the heating medium leaves the fuel processor. These heated gases are transported to the fuel cell for convective heat transfer in the fuel cell, such as passing the heated gases over one or more heat transfer appendages 46 for convective heat transfer from the warmer gases into the cooler heat transfer appendages.

In another embodiment, burner 30 is a catalytic burner and the heating medium comprises the fuel source. Catalytic combustion in burner 30 is often incomplete and the burner exhaust gases include unused and gaseous methanol. Fuel cell 20 then comprises a thermal catalyst that facilitates production of heat in the fuel cell in the presence of methanol. The fuel source is typically vaporized prior to reaching the burner to facilitate catalytic combustion. In this case, conduit 35 transports the gaseous and unused methanol to the thermal catalyst in fuel cell 20. Suitable methanol catalysts, such as platinum or palladium coated onto alumina pellets, are also described herein with respect to catalyst 104 in burner 30.

In one embodiment, the heating medium is transported to the fuel cell during a start-up period before the fuel cell begins generating electrical energy, e.g., in response to a request for electrical energy. Heating a fuel cell in this manner allows fuel cell component operating temperatures to be reached sooner and expedites warm-up time needed when initially turning on fuel cell 20. In another embodiment, the heating medium is transported from the fuel processor to the fuel cell during a period of non-activity in which the fuel cell does not generate electrical energy and the component cools. Since many fuel cells require elevated temperatures for operation and the electrical energy generating process is exothermic, the fuel cell usually does not require external heating during electrical energy generation. However, when electrical energy generation ceases for an extended time and the component drops below a threshold operating temperature, the heating medium may then be transported from the fuel processor to regain the operating temperature and resume electrical energy generation. This permits operating temperatures in a fuel cell to be maintained when electrical energy is not being generated by the fuel cell.

Although FIGS. 1A and 1B are illustrated with respect to the reformer and burner, it is anticipated that a fuel cell package may include other fuel processor designs. Many architectures employ a planar reformer disposed on top or below to a planar burner. Micro-channel designs fabricated in silicon commonly employ such stacked planar architectures may be used. Other fuel processors may be used that process fuel sources other than methanol. Fuel sources other than methanol were listed above, and processors for these fuels are not detailed herein for sake of brevity. Further description of planar fuel processors suitable for use are included in commonly owned co-pending patent application Ser. No. 10/877,044, entitled "Annular Fuel Processor And Methods", filed Jun. 25, 2004 which is incorporated by reference for all purposes.

Figure 3C:
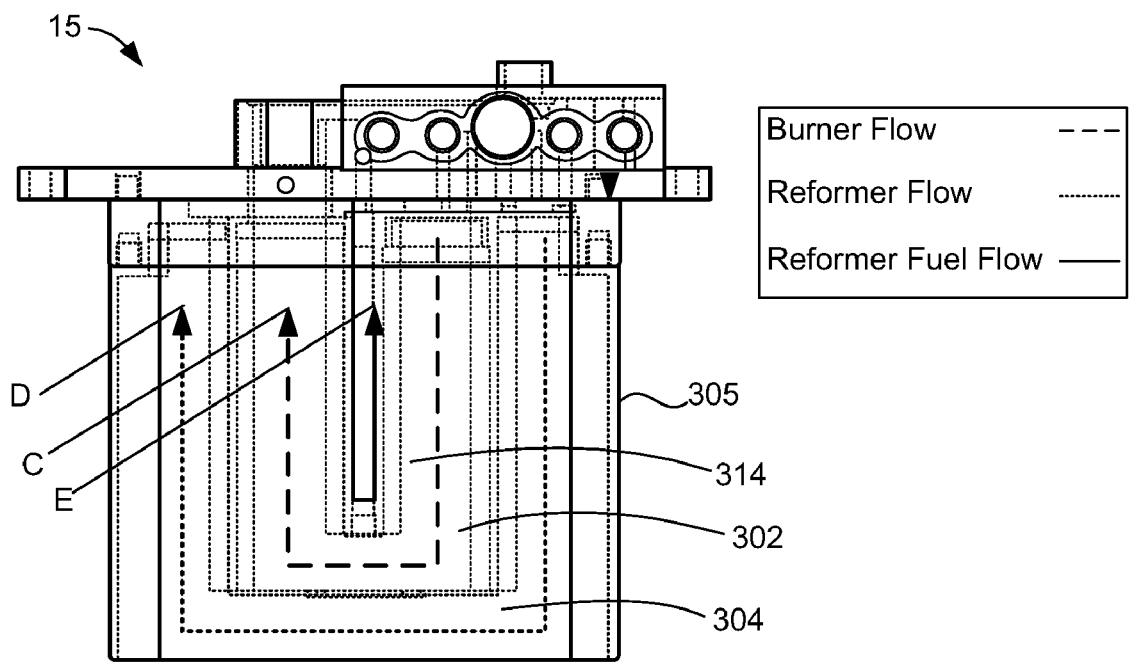

FIGS. 3A-3D illustrate an example flow path for a fuel in a fuel processor. FIG. 3A is a schematic diagram of a counter-flow path for fuel used in a fuel processor, such as in the example fuel processors described herein with reference to FIGS. 1A, 1B, 8, and 10A. Current fuel processors may have fuel flows that are in a counter-flow orientation as illustrated in FIG. 3A. Fuel in burner chamber 302 may flow in the direction of arrow A while fuel in the reformer chamber 304 may flow in the direction of arrow B, which may be partially counter to the fuel flow in burner chamber 302. The fuel and air in the burner chamber 302 combusts more at the beginning 306 of the burner chamber 302, rather than at the end 310, because of the higher concentration of each reactant. The reaction is an exothermic reaction and the heat released is formed through the oxidation of the fuel such as hydrogen, methanol, ethanol, and other fuel sources. This leads to a higher heat production at the beginning 306 of the burner chamber 302 as illustrated in FIG. 3A where the hottest areas are represented by the darker shading. The heat release in the burner chamber 302 may decrease over its length toward the end 310 of the burner chamber 302, as represented by the lighter shading, and the end or downstream section 310 of the burner chamber 302 may be primarily dedicated to cleaning up pre-combustion products such as carbon monoxide, formaldehyde, and other products.

The fuel (e.g. methanol and water mixture) in the reformer chamber 304 may also reform more at the beginning 308 of the reformer chamber 304 because of a higher concentration of reactants. However, this is an endothermic reaction and therefore is a higher heat sink where heat demand is the highest, as represented by the lighter shading at the beginning 308. As the reaction completes to form carbon dioxide and water at the end 312 of the reformer chamber 304, the reaction may become partially exothermic and release some heat, as represented by the darker shading at end 312.

Thus, in a counter-flow orientation, the temperature is slightly higher at the beginning 306 of the burner chamber 302, which provides more heat to the reformer at the end 312 of the reformer flow path. This provides more energy to convert any remaining methanol in the reformer stream at the end of the reformer flow path.

FIG. 3B a schematic diagram of a co-flow path for fuel in a fuel processor, such as the embodiment described herein with reference to FIGS. 1A, 1B, 8, and 10A. Fuel in burner chamber 302 may flow in the direction of arrow C while fuel in the reformer chamber 304 may flow in the direction of arrow D, which may be in the same direction as the fuel flow in burner chamber 302. In this co-flow configuration, the hottest section 310 of the burner chamber 302 may be adjacent to the beginning 308 of the reformer chamber 304 where heat demand is the highest. This co-flow configuration may result in reduced burner exhaust temperature and/or reduced heat load in the burner thereby increasing the efficiency of the fuel processor 15 and the overall electrical efficiency and energy density of the system 10.

Thus, by matching the heat production of the burner chamber 302 and the heat load of the reformer chamber 304, the efficiency of the fuel processor 15 may be improved, and the catalysts in each chamber 302,304 may be more effectively used. Moreover, by orienting the flows to be co-flow or in the same direction in the fuel processor 15, the heat loads may be matched, which may prevent hot and cold spots that contribute to poor performance of the system 10.

Figure 3D:
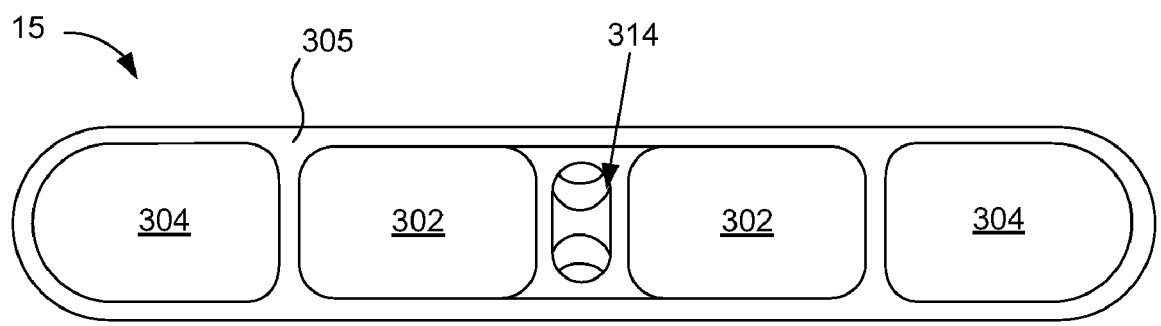

FIG. 3C illustrates an example fuel processor and FIG. 3D is a side view of the fuel processor of FIG. 3C. In use, the fuel for the reformer may be vaporized in a flow passage in the direction of arrow E in a boiler 314 of the fuel processor 15. Vaporizing the fuel way from the reformer chamber 304 may ensure that the vaporization of fuel does not hinder the heat transfer between the burner chamber 302 and the reformer chamber 304. Although illustrated with the use of a boiler 314, this is not intended to be limiting as the reformer fuel may be vaporized with any external device, such as an external heat exchanger or recuperator.

The chambers 302, 304 may be formed in a copper monolith 305 having a high thermal conductivity, hermetic, and non-porous to efficiently facilitate heat transfer between the chambers 302, 304. Other materials such as anodized aluminum, silicon carbide, stainless steel, ceramic, titanium, and the like may also be used.

Once the fuel is vaporized in boiler 314, the fuel may flow to reformer chamber 304 and flow in the direction of arrow D. Fuel from burner chamber 302 may flow in direction of arrow C, the same direction as the reformer fuel flow. The fuel may flow from the burner chamber 302 to the reformer chamber 304. In this embodiment, the flow path for each fuel may be in a U-shape. For example, the fuel flow from the boiler 314 to the reformer chamber 304 may be in a U-shape. Similarly, the fuel flow from the burner chamber 302 to the reformer chamber 304 may be in a U-shape. As discussed in detail below with reference to FIGS. 8, 9A, and 9B, this flow path provides for a smoother and more efficient fuel flow.

Figure 3E:
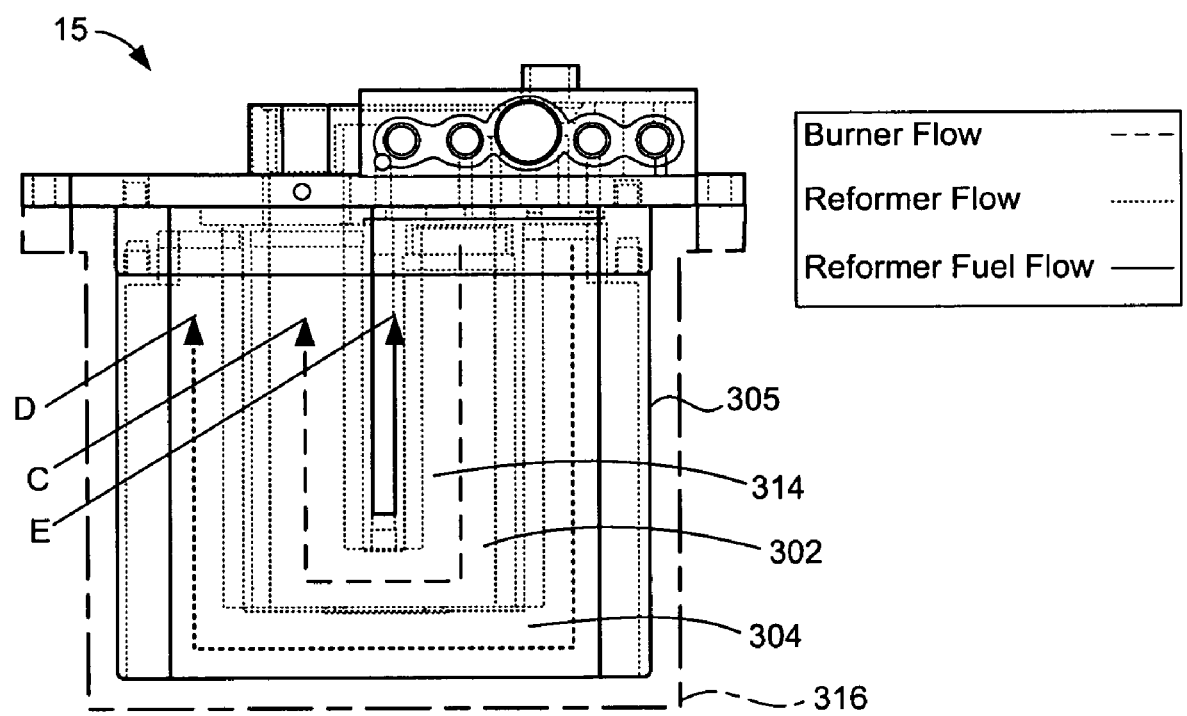
FIG. 3E illustrates the fuel processor of FIG. 3C with a representative regenerator housing shown in dashed lines and FIG. 3F illustrates a cross sectional view of the fuel processor of FIG. 3E along the same line as FIG. 3D with the regenerator housing in place.
Figure 3F:
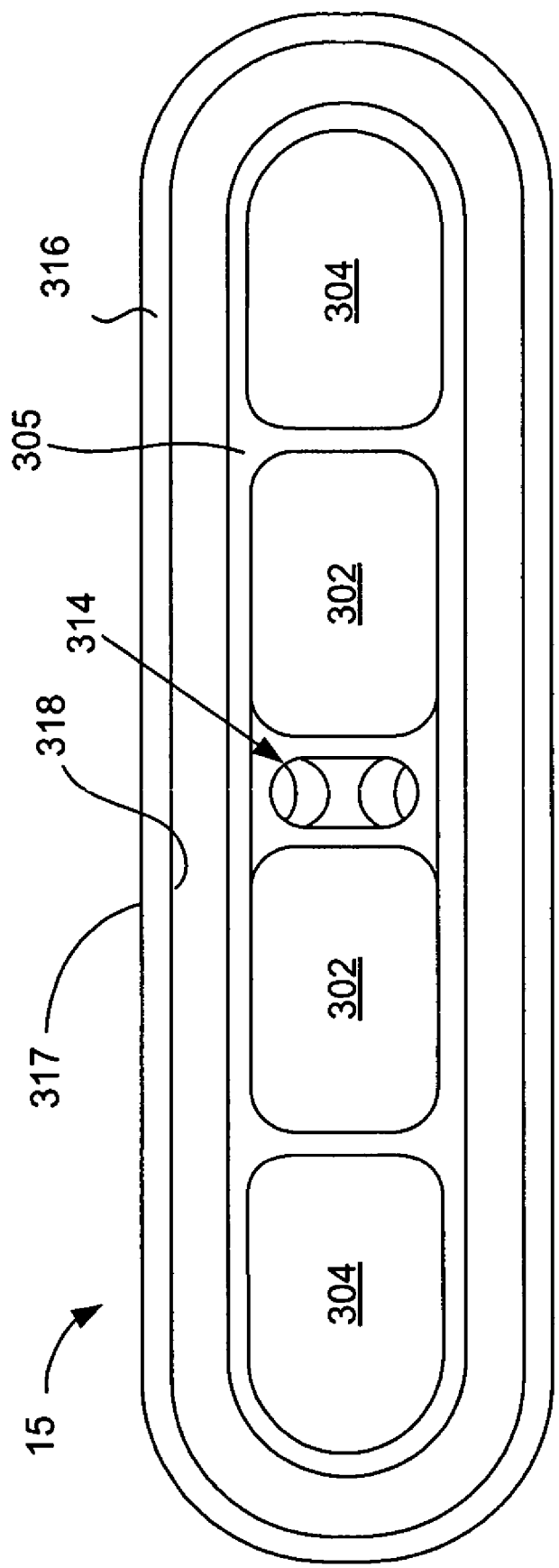

FIG. 3E illustrates the fuel processor 15 of FIG. 3C with a regenerator housing 316 positioned about the copper monolithic 305. FIG. 3F is a cross sectional view of the fuel processor with the regenerator housing 316 in place. In the illustrated embodiment the regenerator housing has a radiative layer 317 on its outer wall and a reflective layer 318 on its inner wall.

Figure 4:
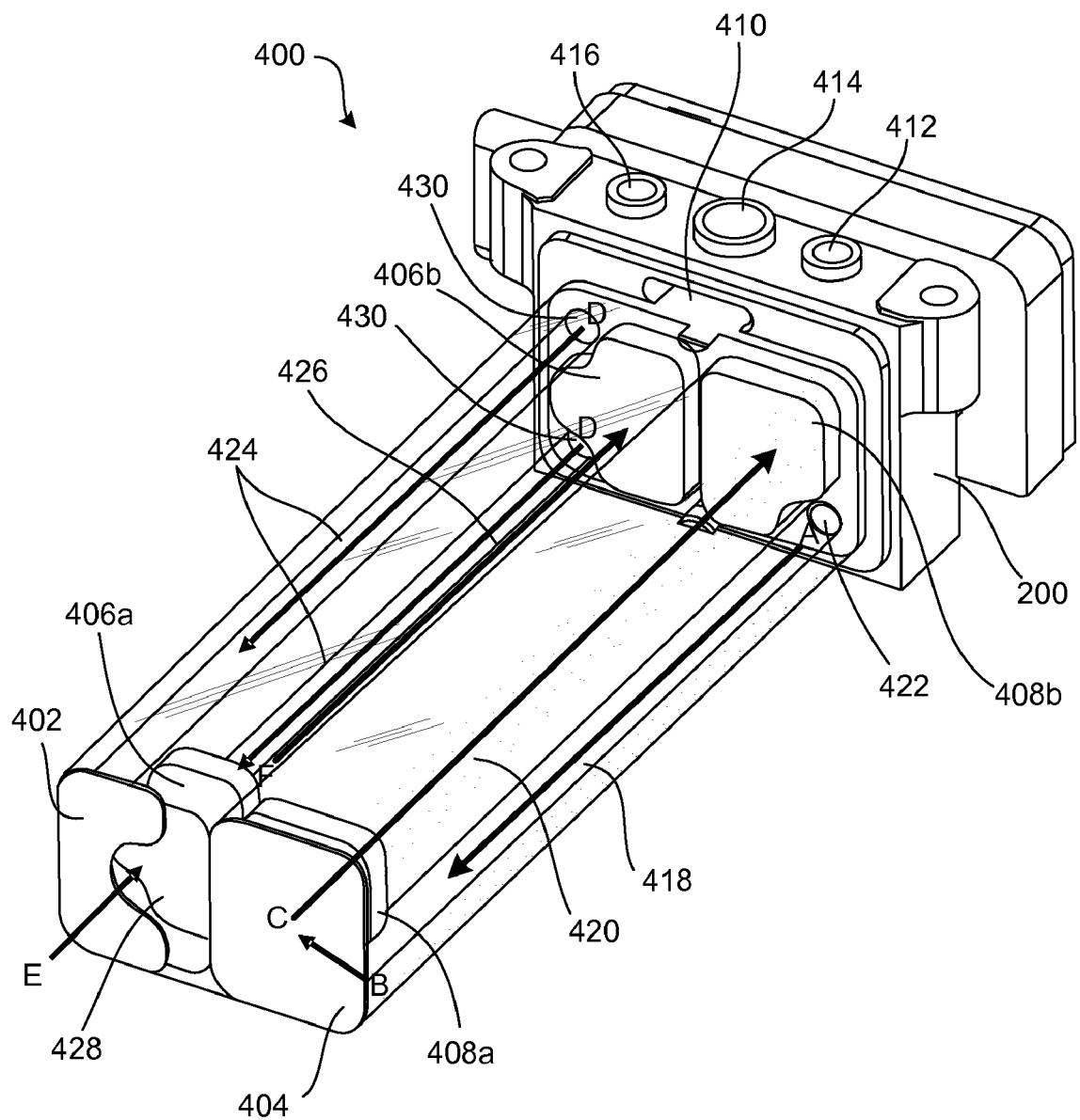
FIG. 4 illustrates an example flow path for a fuel in another example fuel processor.

FIG. 4 illustrates an example flow path for a fuel in another example fuel processor. The fuel processor 400 may be a single pass fuel processor whereby the burner fuel flow and the reformer fuel flow are in the same direction. Although illustrated in a co-flow orientation, it is not intended to be limiting as the flow directions of the burner fuel and the reformer fuel may be partially counter to each other. As illustrated, fuel processor 400 may be used with the manifolds in interconnect 200. Fuel processor 400 may have at least two chambers, a reformer chamber 404 and a burner chamber 402. The burner chamber 402 may have at least two flow passages 424 and 426. Ambient air may be received from air inlets 416, 428 or from regenerator air inlet 414. A regenerator (not shown) may be used to enclose the fuel processor 400 to pre-heat the ambient air. Example regenerators are discussed throughout and will not be discussed herein for brevity.

Air may enter burner chamber 402 from air inlet 416 and be directed into burner chamber 424 via openings 430 in the direction of arrows D. Air in burner chamber 424 may contact catalyst 406a and be directed to flow passage 426 in the direction of arrow F. Air may also be directed into burner chamber 426 via air inlet 428 in the direction of arrow E. Air may be directed into the burner chamber 426 by any known means such as a fan. The air may contact catalyst 406b and exit the burner chamber 402 at burner exhaust 410.

The reformer chamber may have at least two flow passages 418 and 420. Flow passage 418 may receive fuel from inlet 422 in the direction of arrow A. The fuel may contact reformer catalyst 408a and flow in the direction of arrow B. The fuel may then be directed to flow into flow passage 420 in the direction of arrow C toward catalyst 408b and exit at reformer exhaust 412.

The combustion and reforming reactions in the burner chamber 402 and reformer chamber 404, respectively, may run substantially parallel to each other and in the same direction as illustrated with arrows C and F. Thus, the orientation of the fuel flows in the chambers 402, 404 may match the heat loads in the fuel processor as discussed above with reference to FIG. 3B. Thus, the co-flow configuration may result in reduced burner exhaust temperature and/or reduced heat load in the burner thereby increasing the efficiency of the fuel processor 400 and the electrical efficiency and energy density of the system 10.

Figure 5A:
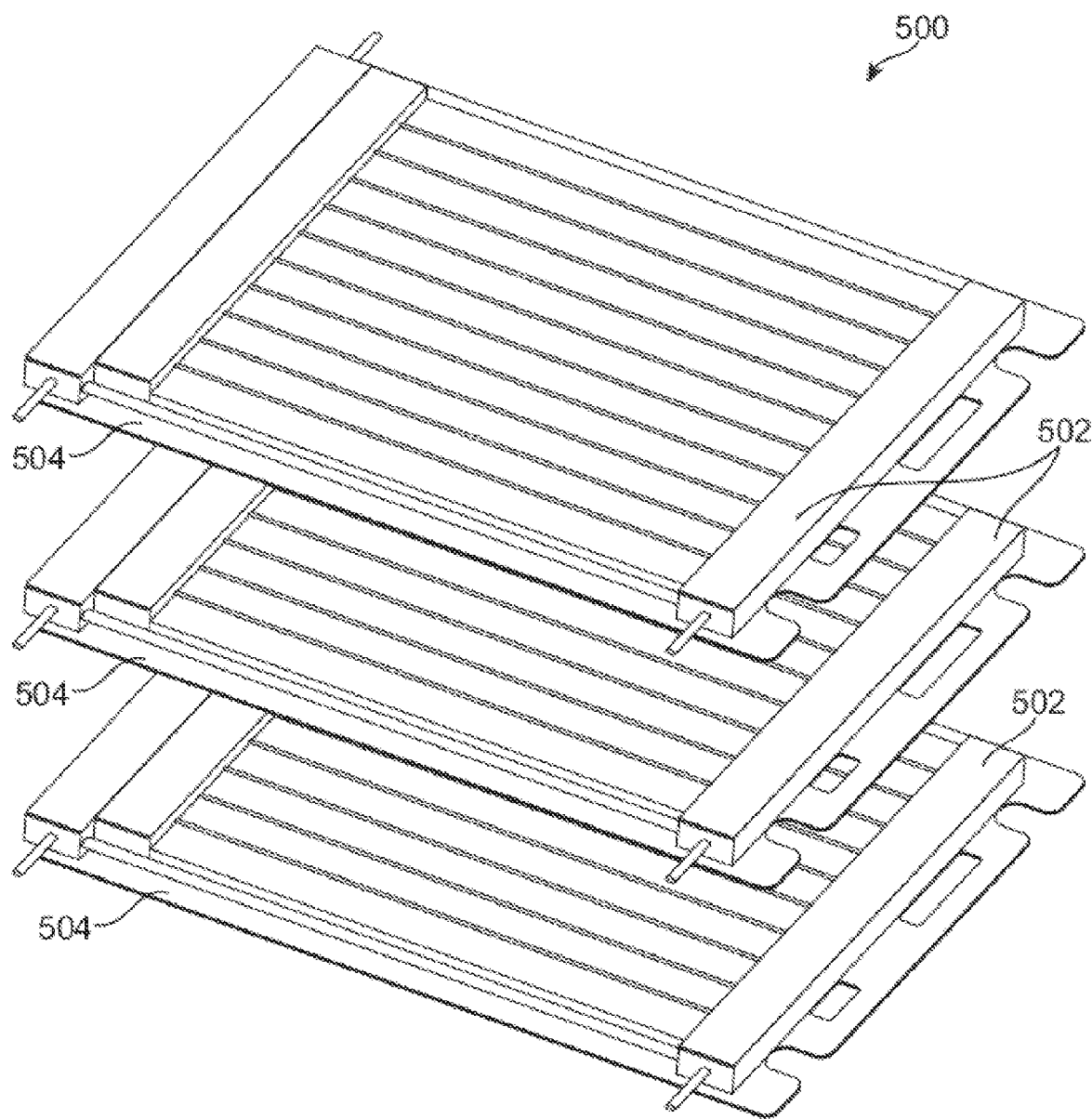
FIGS. 5A-5E illustrate exemplary distributed fuel processors and methods of manufacturing the distributed fuel processors.

FIGS. 5A-5E illustrate exemplary distributed fuel processors and methods of manufacturing the distributed fuel processors. FIG. 5A illustrates the distributed fuel processor positioned within a fuel cell stack. In one embodiment, the distributed fuel processor 502 may be positioned directly between membrane electrode assemblies (MEAs) 504 (e.g., bi-polar plates) of a fuel cell stack 500. In another embodiment, the distributed fuel processor 502 may be integral with the MEA 504 as illustrated with reference to FIGS. 5C and 5D. The distributed fuel processors 502 may be designed and configured to deliver hydrogen to the MEA 504. Since the distributed fuel processors 502 may be integrated directly onto the periphery of the bi-polar plate, use of the distributed fuel processors 502 may reduce the complexity, volume and mass associated with fluidic and gaseous distribution between a fuel cell and a fuel processor. Having the distributed fuel processor 502 either integrated directly onto the periphery of or integral with the MEA 504 may result in a substantially smaller and modular reformed fuel cell system. Moreover, the heat generated by the distributed fuel processors 502 may provide direct heating of the fuel cell stack 500 to more quickly and efficiently achieve operational temperatures for the MEA.

Figure 5B:
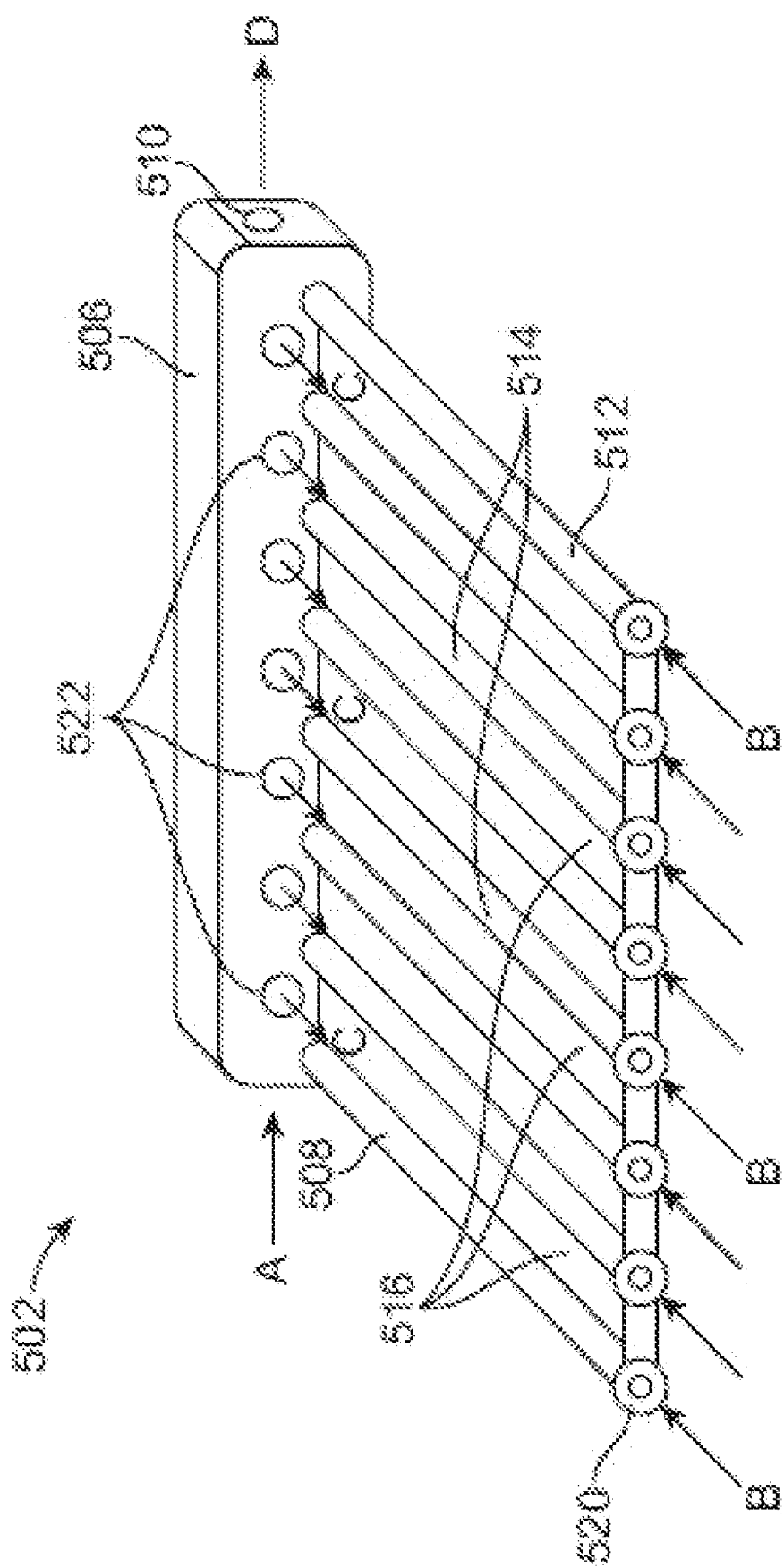

FIG. 5B illustrates a perspective cross-sectional view of the distributed fuel processor. The distributed fuel processor 502 may have a burner 506 coupled to the fuel processor first end 508. The burner 506 may have an inlet (not shown) substantially opposite an exhaust port 510. The inlet may allow gasses, such as air, to enter the burner 506 in the direction of arrow A. The inlet and exhaust port 510 may be an opening in the burner 506. Alternatively, a tube may be used as the inlet and/or exhaust port 510. Any exhaust gasses may exit the burner 506 at the exhaust port 510 in the direction of arrow D. The burner 506 may have a catalyst channel therein (not shown) filled with catalyst, such as alumina beads coated with ultra-fine Platinum powder.

The fuel processor 502 may have a heat exchanger 512 having a plurality of parallel micro-tubes 514. The micro-tubes may have an outer diameter of about 0.5 mm-3 mm. The micro-tubes 514 may be thermally and electrically conductive and joined parallel along their outer surface via brazing, laser, ultrasonic, or any other welding methods. The micro-tubes may then form a flow field tube array whereby gases may flow between channels 516 formed between the micro-tubes 514.

Although not illustrated, a second burner may be positioned at the second end 520 of the distributed fuel processor 502. In use, fuel, such as air or a methanol/water mixture, may be flowed into the burner 506 and second burner through inlet in the direction of arrow A. Through conductive heating by the burners 506, the fuel is vaporized and enters the micro-tubes 514, such as in the direction of arrow B. The inside walls of the micro-tubes 514 may be coated with an active reformer catalyst. As such, the micro-tube 514 array may play a dual role as a flow field and as a reformer.

In one embodiment, the reformed catalyst may be deposited into the micro-tubes by depositing a solution of the active catalyst into the solution flowing through the micro-tubes. In this case, an adhesive substrate such as alumina or silica nanoparticles may be used. In another embodiment, the substrate may be etched either chemically or electrochemically from an aluminum tube. Such methods may be used to deposit active steam reforming catalyst. In yet another embodiment, a spray powder may be milled to sub-micron particle sizes or prepared as nanoparticles for deposition into the micro-tubes. In still another embodiment, the active catalyst may be trapped inside a macro cage of a zeolite and the modified zeolite may be deposited into the micro-tubes. Other known methods may also be used to deposit the catalyst in the micro-tubes 514.

The fuel may react with the reformer catalyst in the micro-tubes 514 to form reformate. The resulting reformate may exit the micro-tubes at apertures 522 in the direction of arrow C on each end of the distributed fuel processor 502. The apertures 522 may be positioned on an anode side such that the hydrogen from the reformate flows into the anode gas diffusion layer of the MEA.

Figure 5C:
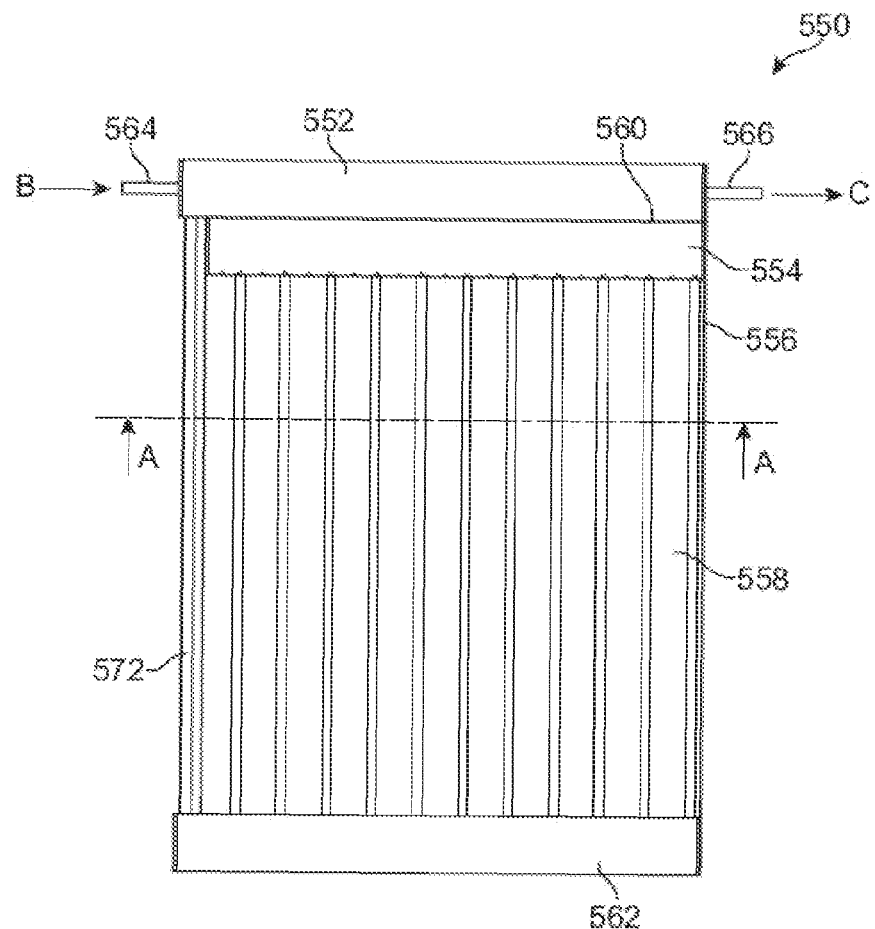

FIG. 5C illustrates a top view of a distributed fuel processor integral with an MEA. In one embodiment, the distributed fuel processor 550 may be used in a reformed methanol fuel cell (RMFC). A burner 552 and reformer 554 may be positioned on a periphery of the MEA or bi-polar plate 558. In a specific embodiment, the burner 552 may be located on an outermost edge or at a first side 556 of the MEA 558. The burner may have an inlet 564 and a burner exhaust 566. The inlet 564 may receive gasses in the direction of arrow B to flow into the burner 552 and burner exhaust gasses may exit the burner exhaust 566 in the direction of arrow C. The reformer 554 may be parallel to and positioned between the burner 552 and MEA 558. This allows the reformer 554 to be located inboard and adjacent to the burner 552 thereby sharing a common surface 560 for the purposes of heat transfer from the burner 552 to the reformer 554. Although illustrated with the burner 552 and reformer 554 positioned on first side 556, the position of the burner 552 and reformer 554 is not intended to be limiting as they may be located on either of the other three sides of the MEA 558.

The burner 552 may have a catalyst channel therein (not shown) filled with catalyst, such as alumina beads coated with ultra-fine Platinum powder. The reformer 554 may have a reformer catalyst channel therein (not shown) filled with catalyst, such as a coarse copper-zinc oxide powder.

During start-up, the burner 552 may receive a fuel, such as a methanol/water ($MeOH$—$H_2O$) blend, through inlet 564. In one embodiment, inlet 564 may be a resistive annular heater tube to vaporize the fuel source upon entry to the burner 552. In another embodiment, the fuel source may be vaporized by a heater source separate from the distributed fuel processor 550. When the vaporized fuel contacts the burner catalyst, heat may be generated along the length of the burner 552 catalyst channel and conductively transfer the heat through the shared wall 560 to the reformer 554 catalyst channel.

The heat in the reformer 554 will react with the catalyst in the reformer 554 catalyst channel to produce reformate (Hydrogen ($H_2$), Carbon Dioxide ($CO_2$) and carbon monoxide (CO)). The reformate may be passed through to the anode gas diffusion layer 574 (FIG. 5D) of the bi-polar plate 558 via reformer outlets 570. The hydrogen may be catalytically reduced to atomic hydrogen in the anode gas diffusion layer 574 of the MEA 558 as further discussed below. Excess or unreacted hydrogen may be collected or diffused at reformate exhaust 562 and routed via channel 572 to combine with the air supplied by inlet 564 to burner 552. Reformate exhaust 562 may be positioned opposite the burner 552 and reformer 554. Excess reformate may thus be exhausted back to the burner 552 and mixed with the depleted air to sustain the catalytic reaction in the burner 552 without using additional fuel source, such as the MeOH-water mixture. Thus, after start-up, the burner 552 heat may be sustained by the excess (or unreacted) hydrogen from the MEA 558 and air. This provides for a more efficient fuel cell system since less fuel may be used.

Figure 5D:
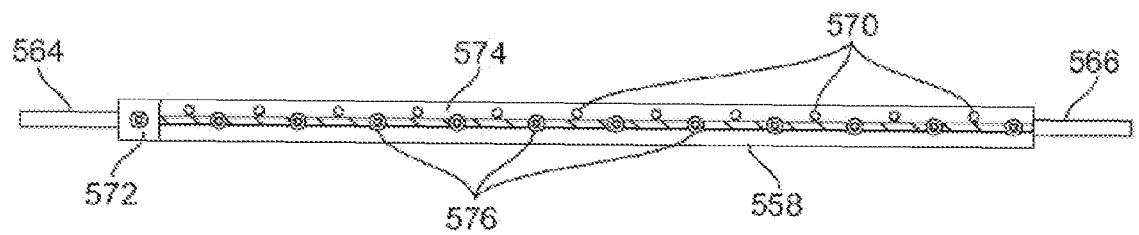

FIG. 5D is a cross-sectional view of yet another example distributed fuel processor. In another embodiment, a plurality of micro-tubes 576, similar to the micro-tubes discussed above with reference to FIG. 5B, may be integrated with the MEA 558. The micro-tubes 576 may have an outer diameter between about 0.5 mm-3 mm. The micro-tubes 576 may be thermally and electrically conductive and joined in parallel along their outer surface via brazing, laser, ultrasonic welding, or any other welding technique. The joined micro-tubes 576 may produce a flow-field tube array. A burner and reformer may be positioned on at least one end of the flow field tube array.

Figure 5E:
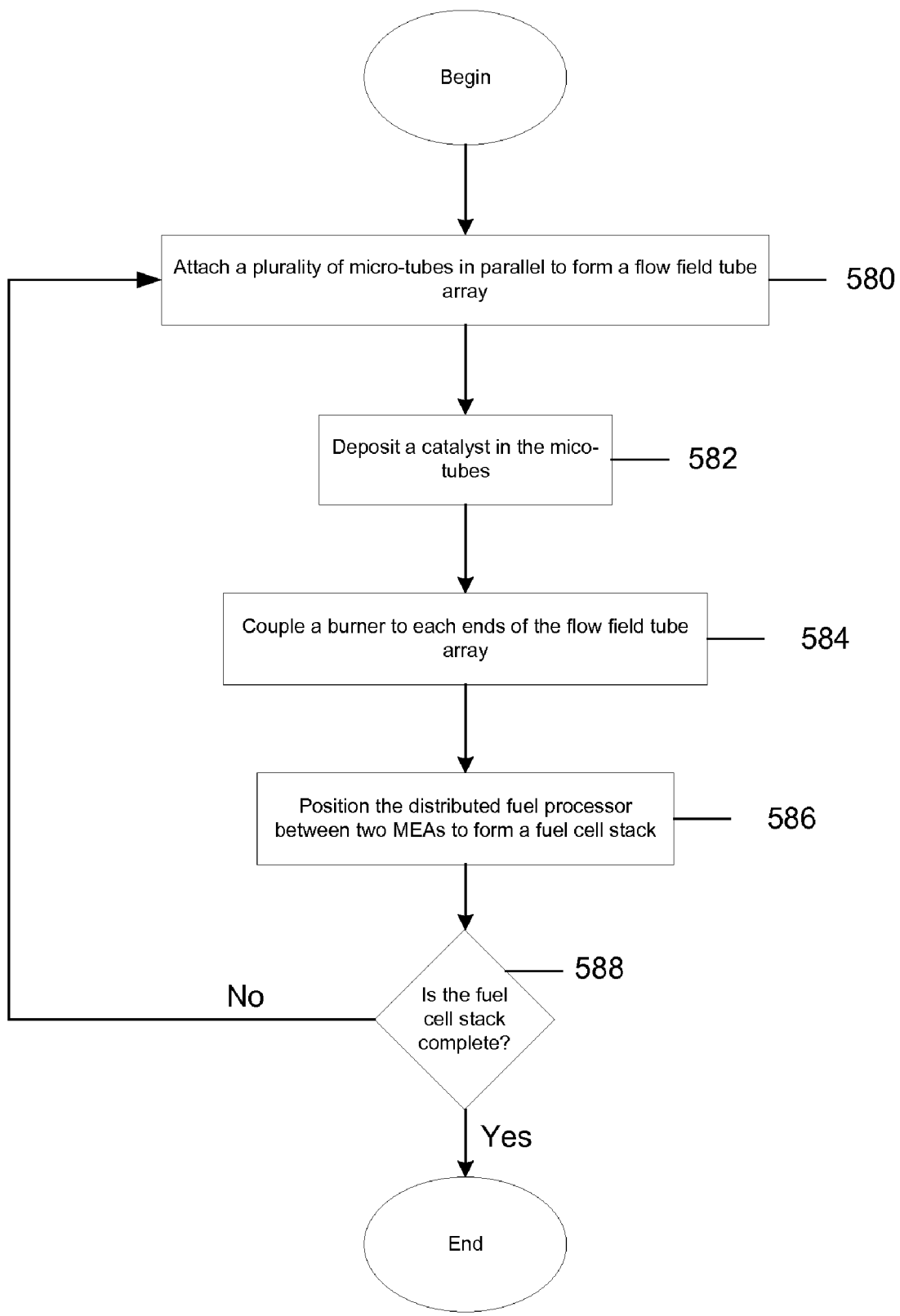

FIG. 5E is a flow diagram illustrating a method for manufacturing a distributed fuel processor. A plurality of micro-tubes may be attached in parallel to form a flow field tube array at 580. The micro-tubes may have an outer diameter of about 0.5 mm-3 mm. The micro-tubes may be thermally and electrically conductive and joined parallel along their outer surface via brazing, laser, ultrasonic, or any other welding methods. The micro-tubes may then form a flow field tube array whereby gases may flow between channels formed between the micro-tubes 514. The flow field tube array may also act as a heat exchanger since heat from the burner may be used to heat the incoming fuel.

Catalyst may be deposited into the micro-tubes at 582. The catalyst deposited may be reformer catalyst. The reformed catalyst may be deposited into the micro-tubes by depositing a solution of the active catalyst into the solution flowing through the micro-tubes. In this case, an adhesive substrate such as alumina or silica nanoparticles may be used. In another embodiment, the substrate may be etched either chemically or electrochemically from an aluminum tube. Such methods may be used to deposit active steam reforming catalyst. In yet another embodiment, a spray powder may be milled to sub-micron particle sizes or prepared as nanoparticles for deposition into the micro-tubes. In still another embodiment, the active catalyst may be trapped inside a macro cage of a zeolite and the modified zeolite may be deposited into the micro-tubes. Other known methods may also be used to deposit the catalyst in the micro-tubes.

A burner may be coupled to each ends of the flow field tube array at 584. The burner may have a catalyst channel filled with catalyst, such as alumina beads coated with ultra-fine Platinum powder. The burner may receive a fuel flow, such as air or a MeOH—$H_2O$ mixture, via an inlet. The heat generated by the burner may be used to vaporize the fuel. The vaporized fuel may then flow into the micro-tubes to form reformate.

The distributed fuel processor may be positioned between two MEAs to form a fuel cell stack at 586. If the fuel cell stack is not completed at 588, additional distributed fuel processor may be formed by repeating steps 580 through 586.

Figure 6A:
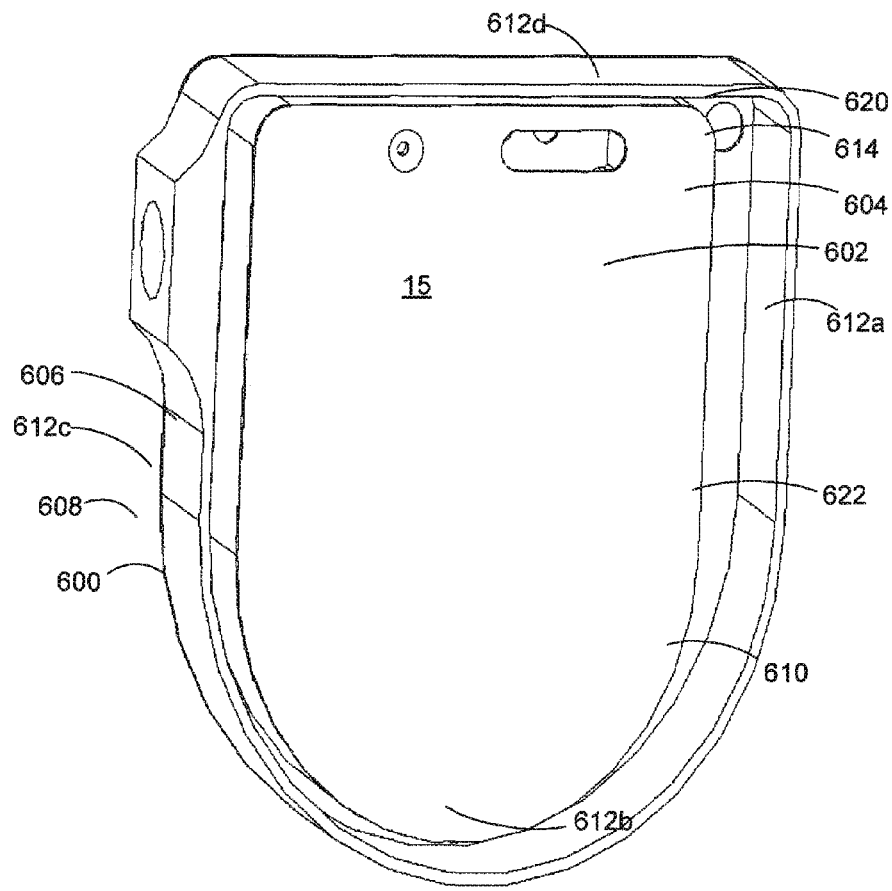
FIGS. 6A and 6B illustrate an example regenerator.
Figure 6B:
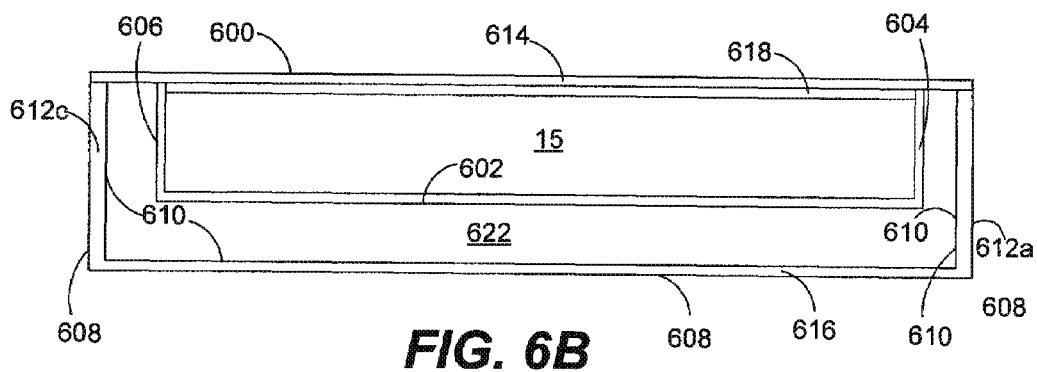

FIGS. 6A and 6B illustrate an example regenerator. While thermal management techniques described herein will now be described as fuel processor components, those skilled in the art will recognize that the methods of thermal management may also be used for general applications. A regenerator 600 may pre-heat a process gas or liquid before it enters burner 30 (FIG. 1B). Regenerator 600 may also reduce heat loss from fuel cell 15 by heating the incoming process liquids or gases before the heat escapes fuel processor 15. In one sense, regenerator 600 may regenerate waste heat in fuel processor 15 to improve thermal management and thermal efficiency of the fuel processor 15. Specifically, waste heat from burner 30 may be used to pre-heat incoming air provided to burner 30 to reduce heat transfer to the air in the burner so more heat transfers to reformer 32. Other exemplary regenerators are also discussed in patent application Ser. No. 10/877,044.

As illustrated in FIG. 1B, fuel processors may have a regenerator having a gap around the entire fuel processor 15. However, due to space constraints, this may be too bulky for smaller compact and portable fuel cell systems. FIG. 6A illustrates an exemplary regenerator enclosing a fuel processor 15. The bottom of the regenerator 600 is not shown to illustrate the fuel processor 15 within the regenerator 600. FIG. 6B is a side cross-sectional view of the exemplary regenerator of FIG. 6A. The regenerator 600, may have a plurality of walls 612a, 612b, 612c, 612d, a top wall 614, and a bottom wall 616 (FIG. 6B) thereby forming an enclosure to enclose the devices of the fuel processor 15. The regenerator 600 may have at least one wall joined or coupled to the fuel processor 15. In other words, a gap between the fuel processor 15 and the regenerator 600 may be on at least one but not all sides around the fuel processor 15. For example, as illustrated in FIG. 6A, the regenerator chamber 622 includes gaps on three sides of the fuel processor 15: the bottom 602, right 604, and left 606 sides. The top 618 of the fuel processor 15 may be joined to the top wall 614 of the regenerator 600. Within the regenerator chamber 622, air may flow and be pre-heated before entering the burner 30.

Joining at least one wall of the regenerator 600 to the main body of the fuel processor 15 may reduce the overall volume of a fuel processor 15, but maintain some gap 622 for pre-heating incoming air. Additionally, this may allow for less exposure to an outer surface 608 of the regenerator 600 which may reduce further heat loss. Moreover, the size of the fuel processor 15 may be reduced yet efficiency improves by reducing heat losses.

In one embodiment, the inner surface 610 of walls 612a-d, 614, 616 of the regenerator 600 may include a radiative or reflective layer of material such as stainless steel, plated ceramic, plated plastic, or other metals. The radiative layer may help to reflect radiant heat from the inner surface 610 into chamber 622. In another embodiment the outer surface 608 of regenerator 600 may also include a radiative layer to decrease radiative heat transfer into the outer surface 608. Generally, the material used in radiative layer may have a lower emissivity than the material used in regenerator 600. Materials suitable for use as a radiative layer may be nickel or a ceramic, for example. The radiative layer may also comprise gold, platinum, silver, palladium, nickel and the metal may be sputter coated onto the inner surface 610 and/or outer surface 608. In one embodiment, radiative layer may have a low heat conductivity such as a ceramic, for example.

Regenerator 600 may be configured such that a process gas or liquid passing through regenerator chamber 622 receives heat generated in burner 30. The process gas or liquid may include any reactant used in fuel processor such as oxygen, air, or fuel source 17 (FIG. 11B), for example. In another embodiment, regenerator 600 may include an air inlet port 620 or hole that permits the passage of air from outside the regenerator 600 into chamber 622. A fan may be used to provide the air directly to fuel processor 15 and pressurize the air coming through port 620. Regenerator 600 offers thus two functions for fuel processor 15: a) it permits active cooling of components within fuel processor 15 before the heat reaches an outer portion of the fuel processor, and b) it pre-heats the air going to burner 30. For the former, air moves through fuel processor 15 and across walls 154 of regenerator 600 such that the cooler air absorbs heat from the warmer fuel processor 15 components. Generally, burner 30 may operate at a temperature greater than about 200 degrees Celsius yet the outer side of the housing 152 remains less than about 50 degrees Celsius.

In embodiments for portable applications where fuel processor 15 occupies a small volume, chamber 622 may be relatively small and comprise narrow channels and ducts. In some cases, the height of chamber 622 may be less than 5 millimeters.

The thermal benefits gained by use of regenerator 600 may also permit the use of higher temperature burning fuels as a fuel source for hydrogen production, such as ethanol and gasoline. In one embodiment, the thermal management benefits gained by use of regenerator 600 may permit reformer 32 to process methanol at temperatures well above 100 degrees Celsius and at temperatures high enough that carbon monoxide production in reformer 32 drops to an amount such that a preferential oxidizer may not be needed.

As mentioned above, regenerator 600 may pre-heat the air going to a burner 30. Burner 30 may rely on catalytic combustion to produce heat. Oxygen in the air provided to burner 30 may be consumed as part of the combustion process. Heat generated in the burner 30 may heat cool incoming air, depending on the temperature of the air. This heat loss to incoming cool air may reduce the heating efficiency of burner 30, and may result in a greater consumption of fuel. To increase the heating efficiency of burner 30, the incoming air may be heated so less heat generated in the burner passes into the incoming air. In other words, air flow formed by regenerator 600 may allow waste heat from the burner 30 to pre-heat air before reaching the burner 30, thus acting as a regenerator for fuel cell 15.

Regenerator 600 may be formed by various known methods. For example, walls 612a-d and 614 may be made with a single mold with bottom wall 616 sealed to walls 612a-d. Depending on the material chosen for walls 612a-d, 614, 616, the bottom wall 616 may be sealed to walls 612a-d via any known method, for example, by laser-welding, ultra-sonic welding, or nuts, bolts, or a gasket.

By allowing fuel processor 15 and regenerator 600 to share at least one wall may improve fuel processor performance by pre-heating air, lowering heat losses from the fuel processor, lowering temperature material selection requirements for heater components, and permit a smaller sized fuel processor.

Figure 7A:
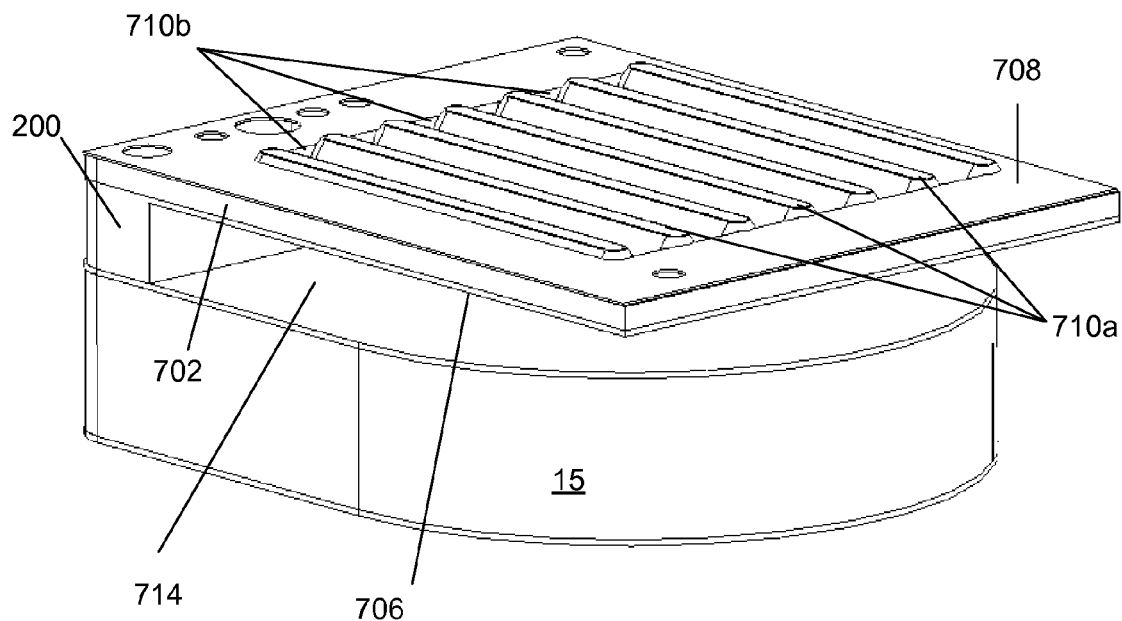
FIGS. 7A, 7B, and 7C illustrate other example recuperators.
Figure 7B:
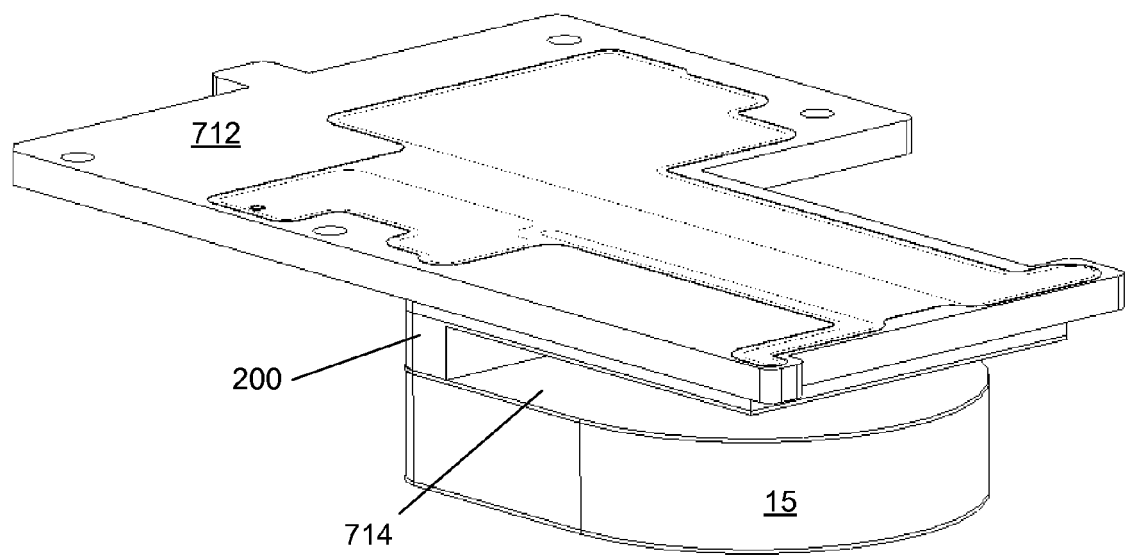
Figure 7C:
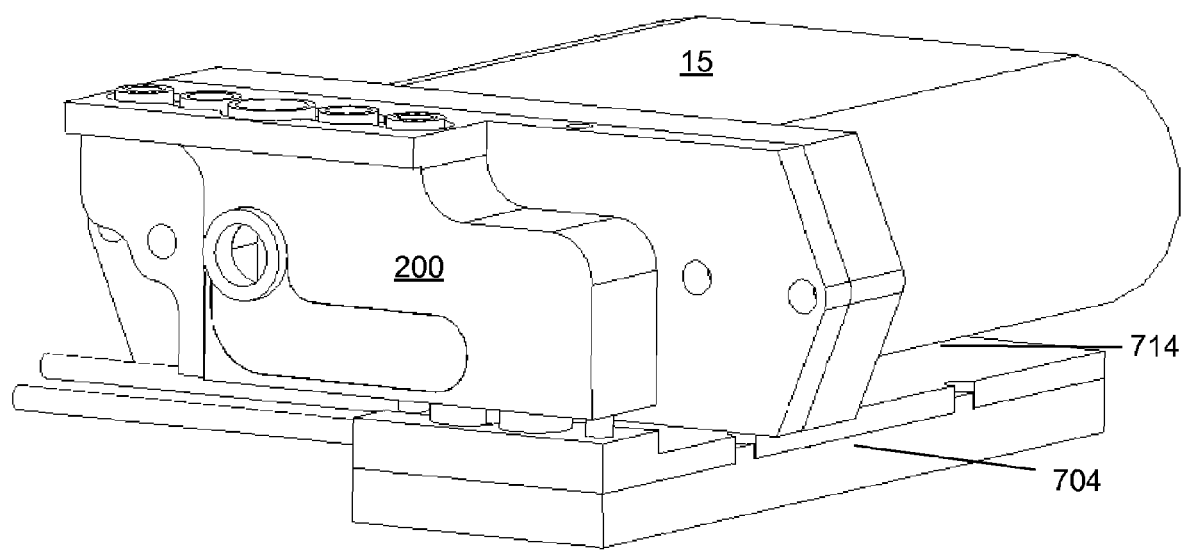

FIGS. 7A, 7B, and 7C illustrate other example recuperators or heat exchangers. A wide variety of recuperators or heat exchanging devices may be suitable for use herein to transfer heat from the heating medium in fuel cell system 10 to the incoming fuel. Descriptions of other exemplary recuperators suitable for use are included in commonly owned co-pending patent application Ser. No. 11/314,810, entitled "Heat Efficient Portable Fuel Cell Systems", filed Dec. 20, 2005, which is incorporated by reference for all purposes.

Thermal efficiency may manage heat loss from a fuel cell system package 10 (FIG. 11B). Many fuel cells and fuel processors operate at elevated temperatures. The electrochemical reaction responsible for hydrogen consumption and electrical energy generation typically requires an elevated temperature. However, the ambient environment around the fuel cell package may be cooler. Thus, heat loss from a fuel cell or fuel processor to the ambient environment decreases efficiency of each device in the package 10 and of the overall fuel cell system 10.

A recuperator may be located adjacent the fuel processor to manage heat loss. For example, FIGS. 7A and 7B illustrate a recuperator 702 positioned above the fuel processor 15. FIG. 7C illustrates a recuperator 704 positioned below the fuel processor 15. The recuperator 702, 704 may be thermally isolated from the fuel processor 15 while still being fluidically connected to the fuel processor 15. Integrating the recuperator 702, 704 above or below the fuel processor 15 may allow for efficient packaging of a fuel cell system or package 10.

Depending on the design of the fuel cell system, the recuperator may be configured to transfer heat from the hot exhaust of a burner in the fuel processor to incoming reformer fuel (liquid or gas). The recuperator may also be configured to transfer heat from hot reformer gas to the incoming reformer fuel, from the hot burner exhaust to the incoming burner fuel, or from the hot exhaust to the cool incoming air. Thus, the configuration of the recuperator is not intended to be limiting as the recuperator may be configured to any desired use.

FIG. 7A illustrates an example recuperator without a cover. FIG. 7B illustrates the recuperator of FIG. 7A with an example cover 712 that may be integrated with the fuel cell manifold. In one embodiment, the recuperator 702 may be located above the fuel processor 15 with a hot side 706 located near the fuel processor 15 and a cold side 708 located away from the fuel processor 15. The hot and cold fuels may flow via adjacent channels 710 in a single monolithic body for the recuperator 702. In one embodiment, the cold fuels may flow in channels 710b and the hot fuels may flow in channels 710a. The cold fuel flow may be located furthest away from the fuel processor 15 to keep outside packaging of the fuel processor 15 or fuel cell system package 10 cooler. The hot fuel flow may be located on the surface facing the fuel processor 15 so that any heat loss may be directed to the fuel processor 15 and vice versa. This heat transfer interaction may reduce over all system exhaust temperature and improve system 10 efficiency.

A separator material between the hot and cold fuel flow channels 710 may be a thin material made out of a high thermally conductive material such as copper, aluminum, or another material with similar thermal characteristics. The monolithic recuperator 702 may be formed through machining, metal-injection molding, or other metal forming processes.

Although illustrated with the use of channels, the shape or design of the recuperator 702 is not intended to be limiting as the recuperator may be of any shape or design. For example, the recuperator may be a single planar plate where the cold fuel flow is on one side (such as the side away from the fuel processor) of the plate and the hot fuel flow is on the opposite side (such as the side facing the fuel processor). The planar plate design may be fabricated through stamping, machining, etching, or other metal forming processes. Thus, other shapes and designs of the recuperator may be used as desired.

As illustrated in FIGS. 7A-7C, the recuperator 702, 704 may be integrated into a manifold between the fuel processor 15 and the fuel cell via interconnect 200. The recuperator 702 may fluidly connect to the corresponding chambers in the fuel processor 15 via one or more thin walled fluid passages in the interconnect 200 so as to reduce heat conduction between the fuel processor 15 and the recuperator 702. Moreover, locating a cold stream chamber in the recuperator 702, 704 at the interface of the fuel processor 15 and fuel cell (not shown) may reduce heat loss from the fuel processor 15 to the fuel cell. Thus, any heat loss will flow from the fuel processor or the fuel cell into the cold stream chamber which may then flow back into the fuel processor carried by the processed fluids, such as air or fuel. This reduces the net heat loss for the fuel cell system and increases efficiency and energy of the fuel cell system.

FIG. 7C illustrates the recuperator 704 positioned below the fuel processor 15, yet in fluid communication with the fuel processor 15 and fuel cell via interconnect 200. The recuperator 704 may be the same recuperator as described above with reference to FIGS. 7A and 7B. However, positioning recuperator 704 below fuel cell 15 may permit the use of a larger sized recuperator 704.

In one embodiment, insulation may be used to reduce heat loss from the fuel cell or fuel processor 15. The insulation may include one or more layers of insulation that are disposed at least partially between a spacing 714 between the fuel processor 15 and the recuperator 702, 704. The insulation arrangement reduces heat transfer from the fuel processor, which in turn reduces heat loss to the ambient environment. Thus, the insulation arrangement keeps heat in the fuel cell and increases efficiency for the system 10 components running at elevated temperatures.

Figure 8:
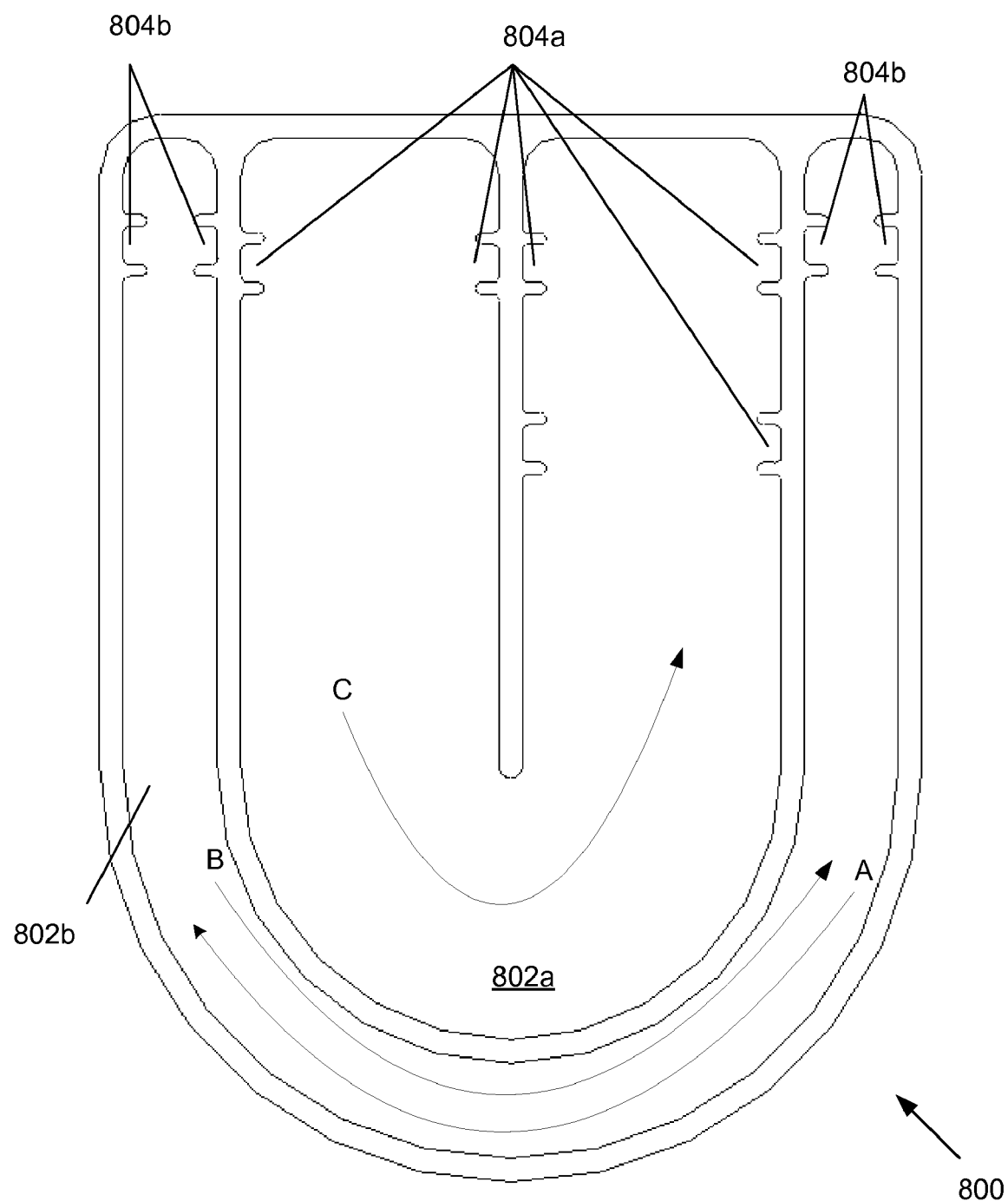
FIG. 8 illustrates an example fuel processor.

Referring now to FIG. 8, an example fuel processor. Prior fuel processors include chambers with flow paths that make 90 degree turns, which increased the pressure drop of gasses in the chambers. The pressure drop creates a higher flow resistance, which in turn, requires the use of more energy to move the fuel flow. Furthermore, the pressure drop creates a slower fuel flow velocity, which does not efficiently use the catalyst beds.

Figure 9B:
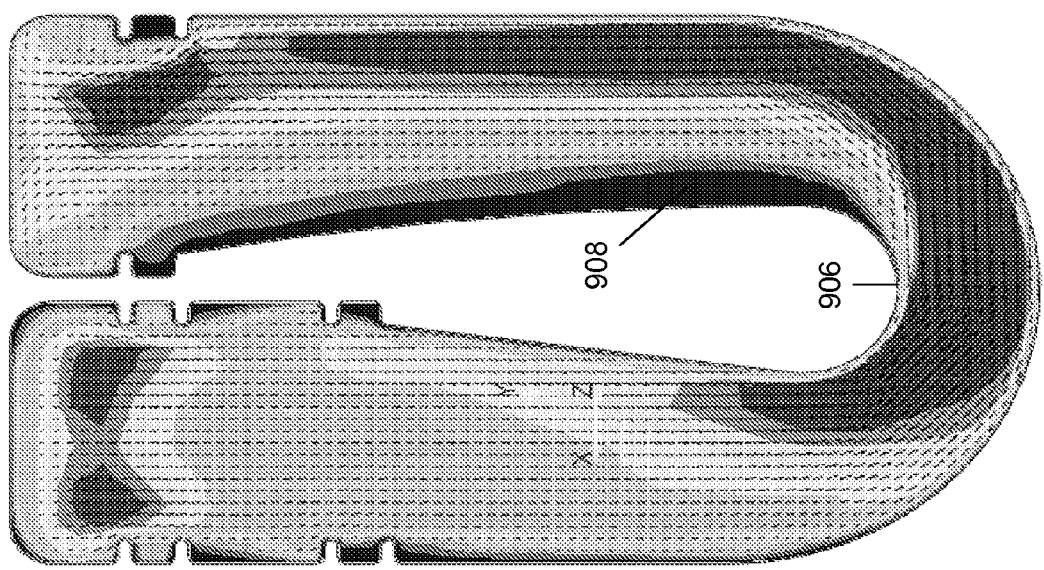
FIGS. 9A and 9B illustrate velocity flows of a fuel through the fuel processor of FIG. 8 and an alternative embodiment of a fuel processor, respectively.

The fuel processor 800 may have a U-shaped fuel flow path to improve performance. The U-shaped flow path may provide for a smoother fuel flow through the fuel processor chambers 802a, 802b which may reduce pressure drops. The curvature of the U-shape may vary as illustrated in FIGS. 9B, 10B, and 10C. In one embodiment, as illustrated in FIG. 8, the curved path may be more gradual for the outside reformer flow chamber 802b than the inside burner flow chamber 802a. The use of small catalyst particles and small chambers may often contribute to pressure drop increases since smaller catalyst particles may pack together tighter thereby resulting in smaller and less voids which results in a greater resistance for the fuel flow. Thus, the gradual curve and slight turn of the reformer flow chamber 802b and the burner flow chamber 802a may permit the flow path to lengthen in a small package and therefore may not contribute to further pressure drop increases even when using small catalyst particles. The chambers 802 may be formed from any material having a high thermal conductivity and able to withstand the desired fuel used, such as copper. The material may also be hermetic, solid, and not porous.

The geometry of the catalyst chambers 804 may, at least partially, define the flow paths through the reformer catalyst beds 804b and burner catalyst beds 804a. Previous fuel processors provided for cutting a metallic center catalyst chamber in the same direction as the flow path, which only allowed for 90 degree turns in flow direction. As discussed above, this may result in large pressure drops. As illustrated in FIG. 8, the catalyst beds 804 may be cut perpendicular to the flow paths, which allows for the flexibility in curving each flow path 802 in a U-shape and lower pressure drops.

In another embodiment, the catalyst bed may have slots (not shown), to receive porous metal foam or porous sintered metal, to hold a catalyst in place and provide diffusion of gases across the chamber. For example, the burner catalyst bed at the beginning of the fuel flow may contain an area for copper shots to help transfer heat to the cold incoming fuel. The copper shot may also help to diffuse fuel and prevent thermal shock from liquid fuel vaporizing on the burner catalysts. The copper shots may act like a boiler for the burner fuel but does not introduce a pressure drop as is often seen in current boiler tubes. In another example, the slots may receive the porous metal or metallic sponge as discussed above with reference to FIG. 2.

In one embodiment, the reformer flow path may be in a counter-flow orientation from the burner flow path as illustrated with arrows A and C. In other words, as air passes through the reformer chamber 802b, it flows in a direction that at least partially counters a direction that the air passes through burner chamber 802a. As discussed above, the temperature is slightly higher at the beginning of a burner chamber 802a, which provides more heat to the reformer at the end of its path. This provides more energy to convert the low concentration of methanol in the reformer stream at the end of a reformer flow path. In another embodiment, the reformer flow path and burner flow path may be the same as illustrated with arrows B and C. Co-flow of the burner flow path and reformer flow path is further described and discussed in detail above with reference to FIGS. 3A and 3D.

Figure 9A:
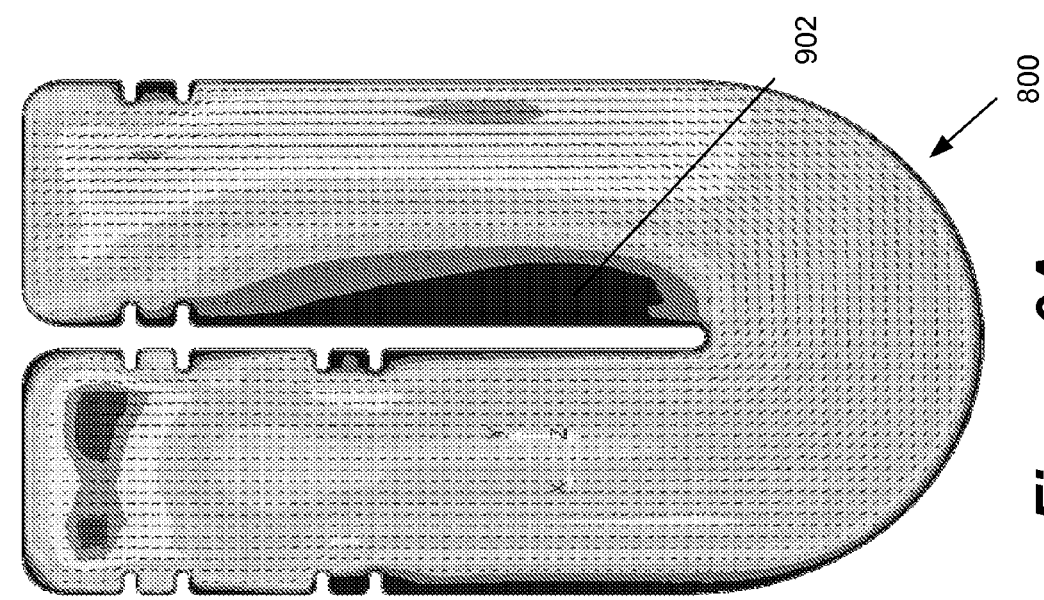

FIGS. 9A and 9B illustrate velocity flows of a fuel through the burner chamber of fuel processor of FIG. 8 and an alternative embodiment of a fuel processor, respectively. As illustrated in FIGS. 8 and 9A, the burner flow path 802a is internal to the reformer flow path 802b and generally follows a similar U-shaped flow path, but at a smaller radius and with a less gradual turn. Computational Fluid Dynamics (CFD) simulations were conducted to determine and/or study the velocity profiles of various flow paths. FIG. 9A illustrates the CFD simulation of the fuel processor of FIG. 8. As illustrated, the flow path is not uniform and has a 0 velocity flow (e.g. no movement) at 902. While the velocity of the flow path does not have to be uniform, a uniform velocity profile improves catalyst usage and efficacy across the flow path. In other words, complete and efficient usage of the catalyst occurs when fuel flows through the catalyst and not when there is no flow, such as at 902.

FIG. 9B illustrates an alternative embodiment of a fuel processor. Use of CFD simulations determined that an extended and more rounded baffle may provide for a better velocity profile uniformity. As illustrated, the fuel processor 904 may be designed to have an extended and rounded baffle 906. Although the velocity flow has a 0 velocity flow at 908, it is less than that of FIG. 9A.

Figure 10A:
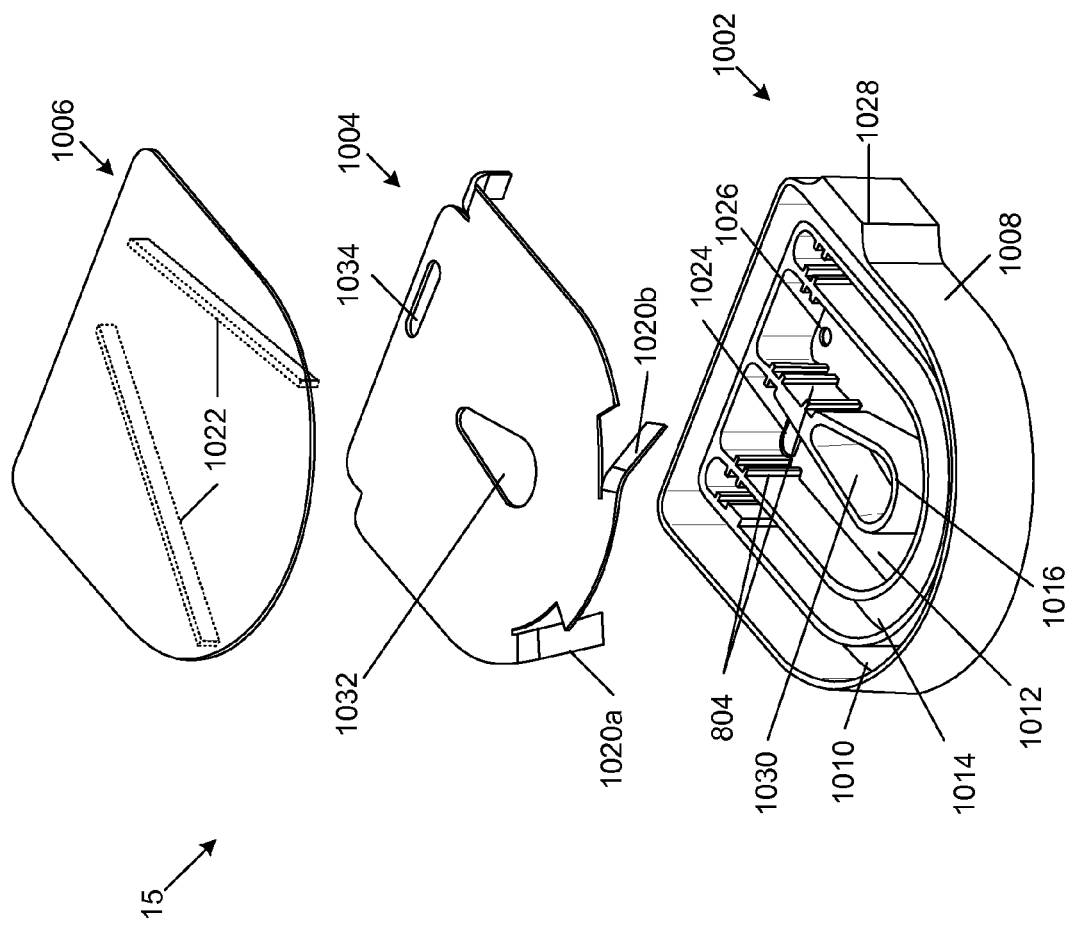
FIGS. 10A, 10B, and 10C illustrate another example fuel processor.
Figure 10C:
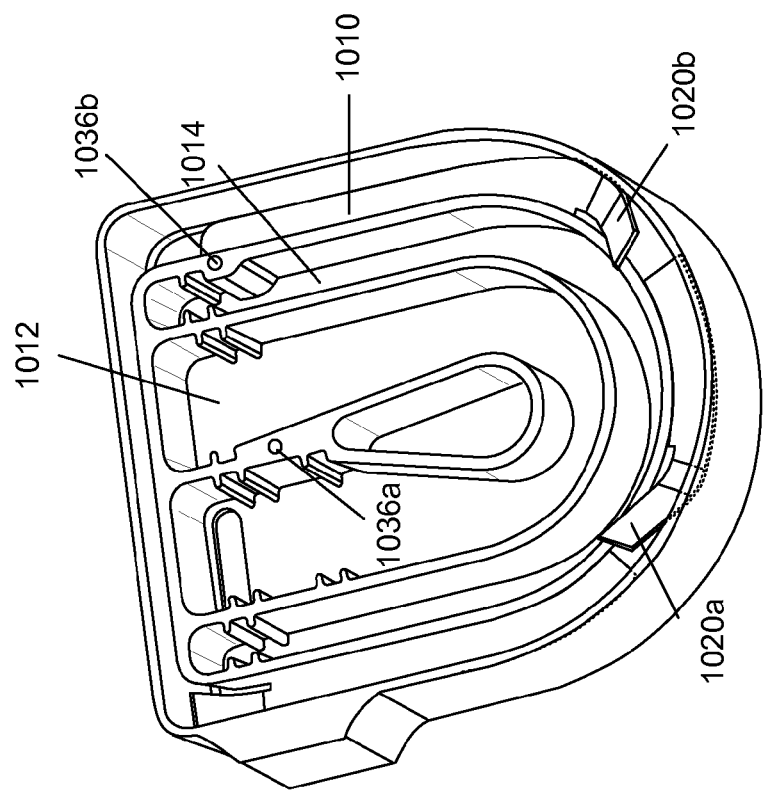
Figure 10B:
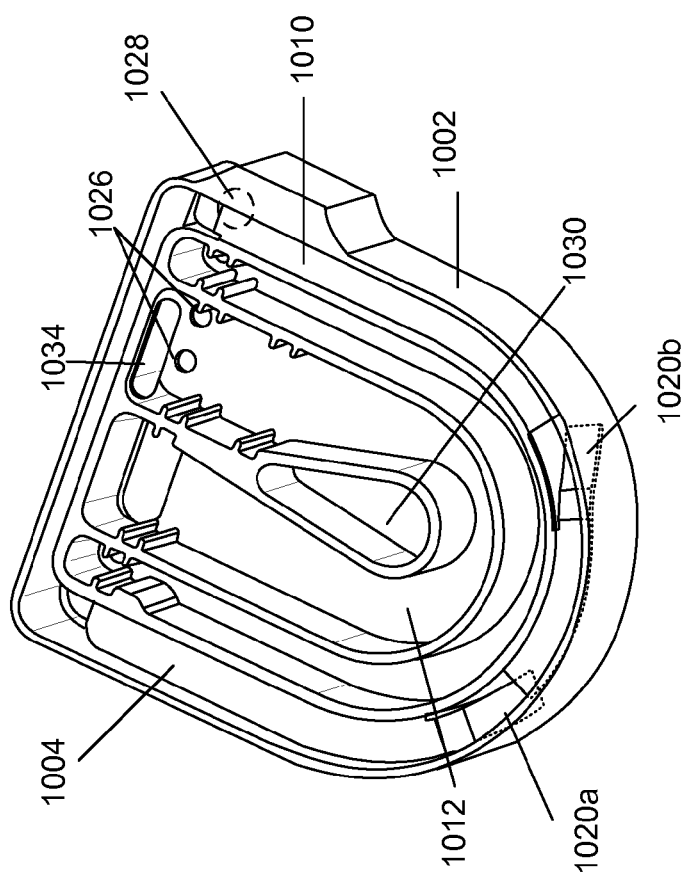

FIGS. 10A, 10B, and 10C illustrate another example fuel processor. Specifically, FIGS. 10A-c illustrate an assembled fuel processor. FIG. 10A illustrates the various parts of the fuel processor. The fuel processor 15 may have at least three parts that include: a bottom plate 1002, an air inlet cover 1004, and a top plate 1006. Although illustrated with three parts, the number of parts is not intended to be limiting as the fuel processor may be assembled without the air inlet cover 1004. Each part may be fabricated separately using various different methods. For example, through-cuts may be made via waterjet cutting, laser cutting, machining, stamping, and/or other metal cutting processes. Any known method may be used to join each part such as brazing and/or laser welding which provides for the use of permanent joints to prevent leaks in the fuel cell system 10.

The bottom plate 1002 may be shaped with an elongated and rounded baffle 1016 for a better velocity flow. Insulation material may be inserted within the thermal well 1030, formed by the elongated and rounded baffle 1016. The insulation may reduce heat loss and improve thermal management of fuel processor 15. The bottom plate may also have a regenerator 1008 similar to the regenerator discussed with reference to FIG. 6A. The regenerator 1008 may be used to also improve thermal management for fuel processor 15 by at least partially thermally isolating some components of the fuel processor 15 and contain heat within the fuel processor 15. Regenerator 1008 may also pre-heat air, received from inlet 1028, in regenerator chamber 1010 before it is received in the burner flow chamber 1012.

Bottom plate 1002 may have a reformer flow chamber 1014 and a burner flow chamber 1012. The burner chamber 1012 may receive fuel from inlets 1026 and/or air inlet port 1034 on air inlet cover 1004. The fuel may then flow out at burner exhaust 1024. As described in detail above with reference to FIG. 8, the burner flow chamber 1012 may have catalyst beds 804 positioned perpendicular to the burner and reformer flow paths.

In one embodiment, besides the internal flow paths, the fuel processor may include various inlets to direct external flow of air that eventually enters burner chamber 1012. Air inlet cover 1004 may have at least one ambient air inlet ramp 1020a, 1020b. The air inlet ramps 1020a, 1020b may be a stamped piece of stainless steel that is bent into a predetermined position. However, the air inlet ramps 120a, b may be made with any other strong material. This air inlet cover 1004 may direct incoming air through a more tortuous path that increases the convective heating of the air before entering the burner chamber 1012 via inlet air port 1034. This may provide for a more even heat distribution of the air. Air inlet cover may also have a thermal well opening 1032 to receive insulation as discussed above. Air inlet cover 1004 may be made of any strong material such as stainless steel.

A top plate 1006 may be used to enclose the fuel cell 15. Top plate may have at least one flow baffle 1022. The flow baffle 1022 may also be used to direct incoming air through a more tortuous path that increases the convective heating of the air before entering the burner chamber 1012 via inlet air port 1034. Although illustrated with a specific layout, the layout of the flow baffles 1022 is not intended to be limiting as the location of the flow baffles 1022 may vary based upon the design of the fuel cell 15 and/or top plate 1006.

FIG. 10B illustrates a top view of the fuel cell and FIG. 10C illustrates a bottom view of the fuel cell. FIGS. 10B and 10C are illustrated with air inlet covers 1004 coupled to the bottom plate 1002. As illustrated, air inlet ramps 1020a, 1020b may be positioned within the regenerator chamber 1010 to direct the incoming air through a more tortuous path to increase conductive heating. In use, ambient air enters inlet 1028 and is directed through regenerator chamber 1010. The air may then be directed on a path either by the air inlet ramps 1020a, 1020b or flow baffles 1022 on top plate 1006 (FIG. 10A) to pre-heat the air. The pre-heated air may then be directed into the burner chamber 1012 via inlet air port 1034.

In one embodiment, at least one thermal sensor may be placed in the fuel cell 15. FIG. 10C illustrates the use of two thermal sensors or thermocouple placement bores. One thermal sensor 1036a may be positioned near the center of the burner 30 and another sensor 1036b may be positioned near the beginning of the reformer flow chamber 1014. The sensors may include thermocouple wells, for example, that are embedded into the structure and removed from the flow stream so as to avoid requiring added sealing of the reformer or burner walls.

The fuel cell above may improve manufacturability, reduce manufacturing cost, provide better seals, improve catalytic and fuel processor performance, and lower pressure drops in each chamber. Additionally, because the pressure drop across the fuel processor is reduced, the pressure specification for the pumps and compressors loosens. This allows for choosing a potentially less expensive, smaller, quieter, and less power intensive pump and/or compressor.

Fuel Cell System Overview

Fuel cell systems that benefit from embodiments described herein will be described. FIG. 11A illustrates a fuel cell system 10 for producing electrical energy in accordance with one embodiment. As shown, 'reformed' hydrogen system 10 includes a fuel processor 15 and fuel cell 20, with a fuel storage device 16 coupled to system 10 for fuel provision. System 10 processes a fuel 17 to produce hydrogen for fuel cell 20.

Storage device, or cartridge, 16 stores a fuel 17, and may comprise a refillable and/or disposable device. Either design permits recharging capability for system 10 or an electronics device using the output electrical power by swapping a depleted cartridge for one with fuel. A connector on cartridge 16 interfaces with a mating connector on system 10 or the electronics device to permit fuel transfer from the cartridge. In a specific embodiment, cartridge 16 includes a bladder that contains the fuel 17 and conforms to the volume of fuel in the bladder. An outer rigid housing of device 16 provides mechanical protection for the bladder. The bladder and housing permit a wide range of cartridge sizes with fuel capacities ranging from a few milliliters to several liters. In one embodiment, the cartridge is vented and includes a small hole, single direction flow valve, hydrophobic filter, or other aperture to allow air to enter the fuel cartridge as fuel 17 is consumed and displaced from the cartridge. In another specific embodiment, the cartridge includes 'smarts', or a digital memory used to store information related to usage of device 16.

A pressure source moves fuel 17 from storage device 16 to fuel processor 15. In a specific embodiment, a pump in system 10 draws fuel from the storage device. Cartridge 16 may also be pressurized with a pressure source such as a compressible foam, spring, or a propellant internal to the housing that pushes on the bladder (e.g., propane or compressed nitrogen gas). In this case, a control valve in system 10 regulates fuel flow. Other fuel cartridge designs suitable for use herein may include a wick that moves a liquid fuel from within cartridge 16 to a cartridge exit. If system 10 is load following, then a sensor meters fuel delivery to processor 15, and a control system in communication with the sensor regulates the fuel flow rate as determined by a desired power level output of fuel cell 20.

Fuel 17 acts as a carrier for hydrogen and can be processed or manipulated to separate hydrogen. The terms 'fuel', 'fuel source' and 'hydrogen fuel source' are interchangeable herein and all refer to any fluid (liquid or gas) that can be manipulated to separate hydrogen. Liquid fuels 17 offer high energy densities and the ability to be readily stored and shipped. Fuel 17 may include any hydrogen bearing fuel stream, hydrocarbon fuel or other source of hydrogen such as ammonia. Currently available hydrocarbon fuels 17 suitable for use with system 10 include gasoline, $C_1$ to $C_4$ hydrocarbons, their oxygenated analogues and/or their combinations, for example. Other fuel sources may be used with system 10, such as sodium borohydride. Several hydrocarbon and ammonia products may also be used.

Fuel 17 may be stored as a fuel mixture. When the fuel processor 15 comprises a steam reformer, for example, storage device 16 includes a fuel mixture of a hydrocarbon fuel and water. Hydrocarbon fuel/water mixtures are frequently represented as a percentage of fuel in water. In one embodiment, fuel 17 comprises methanol or ethanol concentrations in water in the range of 1-99.9%. Other liquid fuels such as butane, propane, gasoline, military grade "JP8", etc. may also be contained in storage device 16 with concentrations in water from 5-100%. In a specific embodiment, fuel 17 comprises 67% methanol by volume.

Fuel processor 15 receives methanol 17 and outputs hydrogen. In one embodiment, a hydrocarbon fuel processor 15 heats and processes a hydrocarbon fuel 17 in the presence of a catalyst to produce hydrogen. Fuel processor 15 comprises a reformer, which is a catalytic device that converts a liquid or gaseous hydrocarbon fuel 17 into hydrogen and carbon dioxide. As the term is used herein, reforming refers to the process of producing hydrogen from a fuel 17. Fuel processor 15 may output either pure hydrogen or a hydrogen bearing gas stream (also commonly referred to as 'reformate').

Various types of reformers are suitable for use in fuel cell system 10; these include steam reformers, auto thermal reformers (ATR) and catalytic partial oxidizers (CPOX) for example. A steam reformer only needs steam and fuel to produce hydrogen. ATR and CPOX reformers mix air with a fuel/steam mixture. ATR and CPOX systems reform fuels such as methanol, diesel, regular unleaded gasoline and other hydrocarbons. In a specific embodiment, storage device 16 provides methanol 17 to fuel processor 15, which reforms the methanol at about 280 degrees Celsius or less and allows fuel cell system 10 usage in low temperature applications.

Fuel cell 20 electrochemically converts hydrogen and oxygen to water, generating electrical energy (and sometimes heat) in the process. Ambient air readily supplies oxygen. A pure or direct oxygen source may also be used. The water often forms as a vapor, depending on the temperature of fuel cell 20. For some fuel cells, the electrochemical reaction may also produce carbon dioxide as a byproduct.

In one embodiment, fuel cell 20 is a low volume ion conductive membrane (PEM) fuel cell suitable for use with portable applications and consumer electronics. A PEM fuel cell comprises a MEA that carries out the electrical energy generating an electrochemical reaction. The MEA includes a hydrogen catalyst, an oxygen catalyst, and an ion conductive membrane that a) selectively conducts protons and b) electrically isolates the hydrogen catalyst from the oxygen catalyst. One suitable MEA is model number Celtec 1000 as provided by BASF—The Chemical Company of Murray Hill, N.J. A hydrogen gas distribution layer may also be included; it contains the hydrogen catalyst and allows the diffusion of hydrogen therethrough. An oxygen gas distribution layer contains the oxygen catalyst and allows the diffusion of oxygen and hydrogen protons therethrough. Typically, the ion conductive membrane separates the hydrogen and oxygen gas distribution layers. In chemical terms, the anode comprises the hydrogen gas distribution layer and hydrogen catalyst, while the cathode comprises the oxygen gas distribution layer and oxygen catalyst.

In one embodiment, a PEM fuel cell includes a fuel cell stack having a set of bi-polar plates. In a specific embodiment, each bi-polar plate is formed from a thin single sheet of metal that includes channel fields on opposite surfaces of the metal sheet. Thickness for these plates is typically below about 5 millimeters, and compact fuel cells for portable applications may employ plates thinner than about 2 millimeters. The single bi-polar plate thus dually distributes hydrogen and oxygen; one channel field distributes hydrogen while a channel field on the opposite surface distributes oxygen. In another embodiment, each bi-polar plate is formed from multiple layers that include more than one sheet of metal. Multiple bi-polar plates can be stacked to produce the 'fuel cell stack' in which a membrane electrode assembly is disposed between each pair of adjacent bi-polar plates. Gaseous hydrogen distribution to the hydrogen gas distribution layer in the MEA occurs via a channel field on one plate while oxygen distribution to the oxygen gas distribution layer in the MES occurs via a channel field on a second plate on the other surface of the membrane electrode assembly.

In electrical terms, the anode includes the hydrogen gas distribution layer, hydrogen catalyst and a bi-polar plate. The anode acts as the negative electrode for fuel cell 20 and conducts electrons that are freed from hydrogen molecules so that they can be used externally, e.g., to power an external circuit or stored in a battery. In electrical terms, the cathode includes the oxygen gas distribution layer, oxygen catalyst and an adjacent bi-polar plate. The cathode represents the positive electrode for fuel cell 20 and conducts the electrons back from the external electrical circuit to the oxygen catalyst, where they can recombine with hydrogen ions and oxygen to form water.

In a fuel cell stack, the assembled bi-polar plates are connected in series to add electrical potential gained in each layer of the stack. The term 'bi-polar' refers electrically to a bi-polar plate (whether mechanically comprised of one plate or two plates) sandwiched between two membrane electrode assembly layers. In a stack where plates are connected in series, a bi-polar plate acts as both a negative terminal for one adjacent (e.g., above) membrane electrode assembly and a positive terminal for a second adjacent (e.g., below) membrane electrode assembly arranged on the opposite surface of the bi-polar plate.

In a PEM fuel cell, the hydrogen catalyst separates the hydrogen into protons and electrons. The ion conductive membrane blocks the electrons, and electrically isolates the chemical anode (hydrogen gas distribution layer and hydrogen catalyst) from the chemical cathode. The ion conductive membrane also selectively conducts positively charged ions. Electrically, the anode conducts electrons to a load (electrical energy is produced) or battery (energy is stored). Meanwhile, protons move through the ion conductive membrane. The protons and used electrons subsequently meet on the cathode side, and combine with oxygen to form water. The oxygen catalyst in the oxygen gas distribution layer facilitates this reaction. One common oxygen catalyst comprises platinum powder thinly coated onto a carbon paper or cloth. Many designs employ a rough and porous catalyst to increase surface area of the platinum exposed to the hydrogen and oxygen. A fuel cell suitable for use herein is further described in commonly owned patent application Ser. No. 11/120,643, entitled "Compact Fuel Cell Package", which is incorporated by reference in its entirety for all purposes.

Since the electrical generation process in fuel cell 20 is exothermic, fuel cell 20 may implement a thermal management system to dissipate heat. Fuel cell 20 may also employ a number of humidification plates (HP) to manage moisture levels in the fuel cell.

While system 10 will mainly be discussed with respect to PEM fuel cells, it is understood that system 10 may be practiced with other fuel cell architectures. The main difference between fuel cell architectures is the type of ion conductive membrane used. In another embodiment, fuel cell 20 is phosphoric acid fuel cell that employs liquid phosphoric acid for ion exchange. Solid oxide fuel cells employ a hard, non-porous ceramic compound for ion exchange and may be suitable for use with embodiments described herein. Other suitable fuel cell architectures may include alkaline and molten carbonate fuel cells, for example.

FIG. 11B illustrates schematic operation for the fuel cell system 10 of FIG. 11A in accordance with a specific embodiment. Fuel cell system 10 is included in a portable package 11. In this case, package 11 includes fuel cell 20, fuel processor 15, and all other balance-of-plant components except cartridge 16. As the term is used herein, a fuel cell system package 11 refers to a fuel cell system that receives a fuel and outputs electrical energy. At a minimum, this includes a fuel cell and fuel processor. The package need not include a cover or housing, e.g., in the case where a fuel cell, or a fuel cell and fuel processor, is included in a battery bay of a laptop computer. In this case, the portable fuel cell system package 11 only includes the fuel cell, or fuel cell and fuel processor, and no housing. The package may include a compact profile, low volume, or low mass—any of which is useful in any power application where size is relevant.

Package 11 is divided into two parts: a) an engine block 12 and b) all other parts and components of system 10 in the portable package 11 not included in engine block 12. In one embodiment, engine block 12 includes the core power-producing mechanical components of system 10. At a minimum, this includes fuel processor 15 and fuel cell 20. It may also include any plumbing configured to transport fluids between the two. Other system components included in engine block 12 may include: one or more sensors for fuel processor 15 and fuel cell 20, a glow plug or electrical heater for fuel heating in fuel processor during start-up, and/or one or more cooling components. Engine block 12 may include other system components.

Components outside of engine block 12 may include: a body for the package, connector 23, inlet and outlet plumbing for system fluids to or from fuel processor 15 or fuel cell 20, one or more compressors or fans, electronic controls, system pumps and valves, any system sensors, manifolds, heat exchangers and electrical interconnects useful for carrying out functionality of fuel cell system 10.

In one embodiment, the engine block 12 includes a fuel cell, a fuel processor, and dedicated mechanical and fluidic connectivity between the two. The dedicated connectivity may provide a) fluid or gas communication between the fuel processor and the fuel cell, and/or b) structural support between the two or for the package. In one embodiment, an interconnect, which is a separate device dedicated to interconnecting the two devices, provides much of the connectivity. In another embodiment, direct and dedicated connectivity is provided on the fuel cell and/or fuel processor to interface with the other. For example, a fuel cell may be designed to interface with a particular fuel processor and includes dedicated connectivity for that fuel processor. Alternatively, a fuel processor may be designed to interface with a particular fuel cell. Assembling the fuel processor and fuel cell together in a common and substantially enclosed package 11 provides a portable 'black box' device that receives a fuel and outputs electrical energy.

In one embodiment, system 10 is sold as a physical engine block 12 plus specifications for interfacing with the engine block 12. The specifications may include desired cooling rates, airflow rates, physical sizing, heat capture and release information, plumbing specifications, fuel inlet parameters such as the fuel type, mixture and flow rates, etc. This permits engine block 12 to be sold as a core component employed in a wide variety of devices determined by the engine block purchaser. Sample devices include: portable fuel cell systems, consumer electronics components such as laptop computers, and custom electronics devices.

Fuel storage device 16 stores methanol or a methanol mixture as a hydrogen fuel 17. An outlet of storage device 16 includes a connector 23 that couples to a mating connector on package 11. In a specific embodiment, connector 23 and mating connector form a quick connect/disconnect for easy replacement of cartridges 16. The mating connector communicates methanol 17 into hydrogen fuel line 25, which is internal to package 11.

Line 25 divides into two lines: a first line 27 that transports methanol 17 to a burner/heater 30 for fuel processor 15 and a second line 29 that transports methanol 17 for a reformer 32 in fuel processor 15. Lines 25, 27 and 29 may comprise channels disposed in the fuel processor (e.g., channels in one or more metal components) and/or tubes leading thereto.

As the term is used herein, a line refers to one or more conduits or channels that communicate a fluid (a gas, liquid, or combination thereof). For example, a line may include a separable plastic conduit. In a specific embodiment to reduce package size, the fuel cell and the fuel processor may each include a molded channel dedicated to the delivering hydrogen from the processor to the cell. The channeling may be included in a structure for each. When the fuel cell attaches directly to the fuel processor, the hydrogen transport line then includes a) channeling in the fuel processor to deliver hydrogen from a reformer to the connection, and b) channeling in the fuel cell to deliver the hydrogen from the connection to a hydrogen intake manifold. An interconnect may also facilitate connection between the fuel cell and the fuel processor. The interconnect includes an integrated hydrogen conduit dedicated to hydrogen transfer from the fuel processor to the fuel cell. Other plumbing techniques known to those of skill in the art may be used to transport fluids in a line.

Flow control is provided on each line 27 and 29. In this embodiment, separate pumps 21a and 21b are provided for lines 27 and 29, respectively, to pressurize each line separately and transfer methanol at independent rates, if desired. A model 030SP-S6112 pump as provided by Biochem, N.J. is suitable to transmit liquid methanol on either line in a specific embodiment. A diaphragm or piezoelectric pump is also suitable for use with system 10. A flow restriction may also be provided on each line 27 and 29 to facilitate sensor feedback and flow rate control. In conjunction with suitable control, such as digital control applied by a processor that implements instructions from stored software, each pump 21 responds to control signals from the processor and moves a desired amount of methanol 17 from storage device 16 to heater 30 and reformer 32 on each line 27 and 29.

Air source 41 delivers oxygen and air from the ambient room through line 31 to the cathode in fuel cell 20, where some oxygen is used in the cathode to generate electricity. Air source 41 may include a pump, fan, blower, or compressor, for example.

High operating temperatures in fuel cell 20 also heat the oxygen and air. In the embodiment shown, the heated oxygen and air is then transmitted from the fuel cell, via line 33, to a regenerator 36 (also referred to herein as a 'dewar') of fuel processor 15, where the air is additionally heated (by escaping heat from heater 30) before the air enters heater 30. This double pre-heating increases efficiency of fuel cell system 10 by a) reducing heat lost to reactants in heater 30 (such as fresh oxygen that would otherwise be near room temperature when combusted in the heater), and b) cooling the fuel cell during energy production. In a specific embodiment, a model BTC compressor as provided by Hargraves, N.C. is suitable to pressurize oxygen and air for fuel cell system 10.

When fuel cell cooling is needed, a fan 37 blows air from the ambient room over fuel cell 20. Fan 37 may be suitably sized to move air as desired by the heating requirements of fuel cell 20; and many vendors known to those of skill in the art provide fans and blowers suitable for use with package 10.

Fuel processor 15 is configured to process fuel 17 and output hydrogen. Fuel processor 15 comprises heater 30, reformer 32, boiler 34, and regenerator 36. Heater 30 (also referred to herein as a burner when it uses catalytic combustion to generate heat) includes an inlet that receives methanol 17 from line 27. In a specific embodiment, the burner includes a catalyst that helps generate heat from methanol, such as platinum or palladium coated onto a suitable support or alumina pellets for example.

In a specific embodiment, heater 30 includes its own boiler to preheat fuel for the heater. Boiler 34 includes a chamber having an inlet that receives methanol 17 from line 29. The boiler chamber is configured to receive heat from heater 30, via heat conduction through one or more walls between the boiler 34 and heater 30, and use the heat to boil the methanol passing through the boiler chamber. The structure of boiler 34 permits heat produced in heater 30 to heat methanol 17 in boiler 34 before reformer 32 receives the methanol 17. In a specific embodiment, the boiler chamber is sized to boil methanol before receipt by reformer 32. Boiler 34 includes an outlet that provides heated methanol 17 to reformer 32.

Reformer 32 includes an inlet that receives heated methanol 17 from boiler 34. A catalyst in reformer 32 reacts with the methanol 17 to produce hydrogen and carbon dioxide; this reaction is endothermic and draws heat from heater 30. A hydrogen outlet of reformer 32 outputs hydrogen to line 39. In one embodiment, fuel processor 15 also includes a preferential oxidizer that intercepts reformer 32 hydrogen exhaust and decreases the amount of carbon monoxide in the exhaust. The preferential oxidizer employs oxygen from an air inlet to the preferential oxidizer and a catalyst, such as ruthenium that is preferential to carbon monoxide over hydrogen.

Regenerator 36 pre-heats incoming air before the air enters heater 30. In one sense, regenerator 36 uses outward traveling waste heat in fuel processor 15 to increase thermal management and thermal efficiency of the fuel processor. Specifically, waste heat from heater 30 pre-heats incoming air provided to heater 30 to reduce heat transfer to the air within the heater. As a result, more heat transfers from the heater to reformer 32. The regenerator also functions as insulation. More specifically, by reducing the overall amount of heat loss from fuel processor 15, regenerator 36 also reduces heat loss from package 11. This enables a cooler fuel cell system 10 package.

In one embodiment, fuel processor 15 includes a monolithic structure having common walls between the heater 30 and other chambers in the fuel processor. Fuel processors suitable for use herein are further described in commonly owned patent application Ser. No. 10/877,044.

Line 39 transports hydrogen (or 'reformate') from fuel processor 15 to fuel cell 20. In a specific embodiment, gaseous delivery lines 33, 35 and 39 include channels in a metal interconnect that couples to both fuel processor 15 and fuel cell 20. A hydrogen flow sensor (not shown) may also be added on line 39 to detect and communicate the amount of hydrogen being delivered to fuel cell 20. In conjunction with the hydrogen flow sensor and suitable control, such as digital control applied by a processor that implements instructions from stored software, system 10 regulates hydrogen gas provision to fuel cell 20.

Fuel cell 20 includes a hydrogen inlet port that receives hydrogen from line 39 and includes a hydrogen intake manifold that delivers the gas to one or more bi-polar plates and their hydrogen distribution channels. An oxygen inlet port of fuel cell 20 receives oxygen from line 31; an oxygen intake manifold receives the oxygen from the port and delivers the oxygen to one or more bi-polar plates and their oxygen distribution channels. A cathode exhaust manifold collects gases from the oxygen distribution channels and delivers them to a cathode exhaust port and line 33, or to the ambient room. An anode exhaust manifold 38 collects gases from the hydrogen distribution channels, and in one embodiment, delivers the gases to the ambient room.

In a specific embodiment, and as shown, the anode exhaust is transferred back to fuel processor 15. In this case, system 10 comprises plumbing 38 that transports unused hydrogen from the anode exhaust to heater 30. For system 10, heater 30 includes two inlets: an inlet configured to receive fuel 17 and an inlet configured to receive hydrogen from line 38. Heater 30 then includes a thermal catalyst that reacts with the unused hydrogen to produce heat. Since hydrogen consumption within a PEM fuel cell 20 is often incomplete and the anode exhaust often includes unused hydrogen, re-routing the anode exhaust to heater 30 allows a fuel cell system to capitalize on unused hydrogen and increase hydrogen usage and energy efficiency. The fuel cell system thus provides flexibility to use different fuels in a catalytic heater 30. For example, if fuel cell 20 can reliably and efficiently consume over 90% of the hydrogen in the anode stream, then there may not be sufficient hydrogen to maintain reformer and boiler operating temperatures in fuel processor 15. Under this circumstance, methanol supply is increased to produce additional heat to maintain the reformer and boiler temperatures. In one embodiment, gaseous delivery in line 38 back to fuel processor 15 relies on pressure at the exhaust of the anode gas distribution channels, e.g., in the anode exhaust manifold. In another embodiment, an anode recycling pump or fan is added to line 38 to pressurize the line and return unused hydrogen back to fuel processor 15. The unused hydrogen is then combusted for heat generation.

In one embodiment, fuel cell 20 includes one or more heat transfer appendages 46 that permit conductive heat transfer with internal portions of a fuel cell stack. This may be done for heating and/or cooling fuel cell 20. In a specific heating embodiment, exhaust 35 of heater 30 is transported to the one or more heat transfer appendages 46 during system start-up to expedite reaching initial elevated operating temperatures in fuel cell 20. The heat may come from hot exhaust gases or unburned fuel in the exhaust, which then interacts with a catalyst disposed on or in proximity with a heat transfer appendage 46. In a specific cooling embodiment, fan 37 blows cooling air over the one or more heat transfer appendages 46, which provides dedicated and controllable cooling of the stack during electrical energy production. Fuel cells suitable for use herein are further described in commonly owned patent application Ser. No. 10/877,770, entitled "Micro Fuel Cell Thermal Management", filed Jun. 25, 2004, which is incorporated by reference in its entirety for all purposes.

Heat exchanger 42 transfers heat from fuel cell system 10 to the inlet fuel 17 before the methanol reaches fuel processor 15. This increases thermal efficiency for system 10 by preheating the incoming fuel (to reduce heating of the fuel in heater 30) and reuses heat that would otherwise be expended from the system. While system 10 shows heat exchanger 42 heating methanol in line 29 that carries fuel 17 to the boiler 34 and reformer 32, it is understood that heat exchanger 42 may be used to heat methanol in line 27 that carries fuel 17 to burner 30.

In one embodiment, system 10 increases thermal and overall efficiency of a portable fuel cell system by using waste heat in the system to heat incoming reactants such as an incoming fuel or air. To this end, the embodiment in FIG. 11B includes heat exchanger, or recuperator, 42.

Heat exchanger 42 transfers heat from fuel cell system 10 to the inlet fuel 17 before the methanol reaches fuel processor 15. This increases thermal efficiency for system 10 by preheating the incoming fuel (to reduce heating of the fuel in heater 30) and reuses heat that would otherwise be expended from the system. While system 10 shows heat exchanger 42 heating methanol in line 29 that carries fuel 17 to the boiler 34 and reformer 32, it is understood that heat exchanger 42 may be used to heat methanol in line 27 that carries fuel 17 to burner 30.

In addition to the components shown in shown in FIG. 1B, system 10 may also include other elements such as electronic controls, additional pumps and valves, added system sensors, manifolds, heat exchangers and electrical interconnects useful for carrying out functionality of a fuel cell system 10 that are known to one of skill in the art and omitted for sake of brevity. FIG. 1B shows one specific plumbing arrangement for a fuel cell system; other plumbing arrangements are suitable for use herein. For example, the heat transfer appendages 46, a heat exchanger and dewar 36 need not be included. Other alterations to system 10 are permissible, as one of skill in the art will appreciate.

System 10 generates direct current (DC) voltage, and is suitable for use in a wide variety of portable applications. For example, electrical energy generated by fuel cell 20 may power a notebook computer 11 or a portable electrical generator 11 carried by military personnel.

In one embodiment, system 10 provides portable, or 'small', fuel cell systems that are configured to output less than 200 watts of power (net or total). Fuel cell systems of this size are commonly referred to as 'micro fuel cell systems' and are well suited for use with portable electronics devices. In one embodiment, the fuel cell is configured to generate from about 1 milliwatt to about 200 Watts. In another embodiment, the fuel cell generates from about 5 Watts to about 60 Watts. Fuel cell system 10 may be a stand-alone system, which is a single package 11 that produces power as long as it has access to a) oxygen and b) hydrogen or a fuel such as a hydrocarbon fuel. One specific portable fuel cell package produces about 20 Watts or about 45 Watts, depending on the number of cells in a stack for fuel cell 20.

While the embodiment discussed herein mainly been discussed so far with respect to a reformed methanol fuel cell (RMFC), the present invention may also apply to other types of fuel cells, such as a solid oxide fuel cell (SOFC), a phosphoric acid fuel cell (PAFC), a direct methanol fuel cell (DMFC), or a direct ethanol fuel cell (DEFC). In this case, fuel cell 20 includes components specific to these architectures, as one of skill in the art will appreciate. A DMFC or DEFC receives and processes a fuel. More specifically, a DMFC or DEFC receives liquid methanol or ethanol, respectively, channels the fuel into the fuel cell stack 60 and processes the liquid fuel to separate hydrogen for electrical energy generation. For a DMFC, shared flow fields 208 in the flow field plates 202 distribute liquid methanol instead of hydrogen. Hydrogen catalyst 126 described above would then comprise a suitable anode catalyst for separating hydrogen from methanol. Oxygen catalyst 128 would comprise a suitable cathode catalyst for processing oxygen or another suitable oxidant used in the DMFC, such as peroxide. In general, hydrogen catalyst 126 is also commonly referred to as an anode catalyst in other fuel cell architectures and may comprise any suitable catalyst that removes hydrogen for electrical energy generation in a fuel cell, such as directly from the fuel as in a DMFC. In general, oxygen catalyst 128 may include any catalyst that processes an oxidant in used in fuel cell 20. The oxidant may include any liquid or gas that oxidizes the fuel and is not limited to oxygen gas as described above. An SOFC, PAFC, or molten carbonate fuel cell (MCFC) may also benefit from inventions described herein, for example. In this case, fuel cell 20 comprises an anode catalyst 126, cathode catalyst 128, anode fuel and oxidant according to a specific SOFC, PAFC, or MCFC design.

While embodiments and applications of this invention have been shown and described, it would be apparent to those skilled in the art having the benefit of this disclosure that many more modifications than mentioned above are possible without departing from the inventive concepts herein.

What is claimed is:

1. A fuel processor for use in a fuel cell system, comprising: regenerator chamber having a first inlet to receive an air flow;
a substantially U-shaped burner flow chamber positioned within the regenerator, the burner flow chamber having a second inlet to receive the air flow from the regenerator and defining a substantially U-shaped burner air flow path; and
a substantially U-shaped reformer flow chamber having a third inlet to receive the air flow from the burner chamber, the reformer flow chamber defining a substantially U-shaped reformer air flow path, wherein the burner flow chamber is nested within the reformer flow chamber and wherein the burner air flow path and the reformer air flow paths are concurrent flow paths; and
wherein the burner flow chamber and the reformer flow chamber are primarily formed within a monolithic structure formed from a single piece of metal that is positioned substantially within the regenerator chamber; and
wherein neither the fuel processor nor the monolith structure have a cylindrical cross sectional configuration.

2. The fuel processor of claim 1, further comprising a burner catalyst provided within the burner flow chamber.

3. The fuel processor of claim 2, wherein the burner catalyst includes a thermally conductive substrate having an alumina layer with an active catalyst deposited thereon.

4. The fuel processor of claim 3, wherein the substrate is an aluminum porous metal or an aluminum metallic sponge.

5. The fuel processor of claim 1, further comprising a reformer catalyst provided within the burner flow chamber.

6. The fuel processor of claim 5, wherein the reformer catalyst includes a thermally conductive substrate having an alumina layer with an active catalyst deposited thereon.

7. The fuel processor of claim 6, wherein the substrate is an aluminum porous metal or an aluminum metallic sponge.

8. The fuel processor of claim 1, wherein the regenerator chamber substantially envelopes the monolithic structure and has a substantially U-shape air flow path that extends around the monolithic structure such that air passing through the regenerator chamber is heated primarily by the monolithic structure.

9. The fuel processor of claim 1 wherein a cross section of the monolithic structure has opposing flat surfaces with legs of the U-shaped burner and reformer flow chambers being arranged in parallel between the opposing flat surface of the monolithic structure in a reformer, burner, burner, reformer order.

10. The fuel processor of claim 1, further comprising at least one thermal sensor coupled to the monolithic structure.

11. The fuel processor of claim 1, further comprising an interconnect header manifold coupled to the monolithic structure to cap the burner flow chamber and the reformer flow chamber.

12. The fuel processor of claim 1, wherein the regenerator further comprises a radiative or reflective layer coupled to an inner wall of the regenerator.

13. The fuel processor of claim 1, wherein the regenerator further comprises a radiative layer coupled to an outer wall of the regenerator.

14. A fuel processor as recited in claim 1, further comprising a fuel vaporizer formed in the monolithic structure, wherein the fuel vaporizer is adapted to vaporize at least some of the fuel used in the fuel processor.

15. A fuel processor as recited in claim 14, wherein the fuel vaporizer has a substantially U-shaped fuel flow path and is positioned in the monolithic structure between a pair of legs of the U-shaped burner flow chamber.

16. A fuel processor for use in a fuel cell system, comprising:
- a regenerator chamber having a first inlet to receive an air flow;
- a substantially U-shaped reformer chamber positioned within the regenerator and having a substantially U-shaped regenerator air flow path;
- a substantially U-shaped burner chamber, the burner chamber having a second inlet to receive the air flow from the regenerator chamber and defining a substantially U-shaped burner air flow path, wherein the burner chamber is nested within the U-shaped reformer chamber and wherein the burner air flow path and the reformer air flow paths are concurrent flow paths;
- a vaporizer arranged to vaporize at least some of the fuel used in the fuel processor, wherein the fuel vaporizer has a substantially U-shaped fuel flow path and is nested within the burner chamber in the monolithic structure between a pair of legs of the U-shaped burner flow chamber; and wherein neither the fuel processor nor the monolith structure have a cylindrical cross sectional configuration;
- wherein the burner chamber, the reformer chamber and the vaporizer are formed in and substantially defined by a monolithic copper structure that is positioned substantially within the regenerator chamber such that during operation, the air flow passing through the regenerator is heated primarily by the monolithic copper structure;
- an interconnect header manifold that caps the regenerator chamber, the burner flow chamber, the reformer flow chamber and the vaporizer;
- a burner end plate secured to the monolithic copper structure that defines a bottom end of the burner flow chamber; and
- a reformer end plate secured to the monolithic copper structure that defines a bottom end of the reformer flow chamber.

* * * * *